US012610164B2

(12) United States Patent
Takeuchi et al.

(10) Patent No.: US 12,610,164 B2
(45) Date of Patent: Apr. 21, 2026

(54) PATCH PANEL WITH EXTENSION CABLE STORAGE

(71) Applicant: Go!Foton Holdings, Inc., Somerset, NJ (US)

(72) Inventors: Kenichiro Takeuchi, North Brunswick, NJ (US); David Zhi Chen, Dallas, TX (US)

(73) Assignee: Go!Foton Holdings, Inc., Somerset, NJ (US)

( * ) Notice: Subject to any disclaimer, the term of this patent is extended or adjusted under 35 U.S.C. 154(b) by 271 days.

(21) Appl. No.: 18/134,173

(22) Filed: Apr. 13, 2023

(65) Prior Publication Data

US 2023/0336895 A1     Oct. 19, 2023

Related U.S. Application Data

(60) Provisional application No. 63/330,383, filed on Apr. 13, 2022.

(51) Int. Cl.
H04Q 1/02 (2006.01)
(52) U.S. Cl.
CPC .............. H04Q 1/09 (2013.01); H04Q 1/131 (2013.01); H04Q 1/133 (2013.01); H04Q 1/136 (2013.01)
(58) Field of Classification Search
CPC ..................... H04Q 1/00–136; G02B 6/00–46
See application file for complete search history.

(56) References Cited

U.S. PATENT DOCUMENTS

| | | | | |
|---|---|---|---|---|
| 7,000,863 | B2 * | 2/2006 | Bethea | G02B 6/4457 |
| | | | | 242/388.6 |
| 8,565,572 | B2 | 10/2013 | Krampotich et al. | |
| 8,938,147 | B2 * | 1/2015 | Krampotich | G02B 6/4457 |
| | | | | 385/135 |
| 9,581,781 | B2 * | 2/2017 | Takeuchi | G02B 6/44526 |
| 10,859,782 | B2 * | 12/2020 | Grunwald | G02B 6/44785 |
| 2010/0322580 | A1 | 12/2010 | Beamon et al. | |
| 2019/0170959 | A1 | 6/2019 | Krampotich et al. | |
| 2019/0319412 | A1 | 10/2019 | Thompson | |
| 2020/0310061 | A1 | 10/2020 | Livingston et al. | |
| 2021/0141184 | A1 | 5/2021 | Krampotich et al. | |
| 2021/0187979 | A1 * | 6/2021 | Kinoshita | B41J 15/046 |

OTHER PUBLICATIONS

International Search Report and Written Opinion issued in Appln. No. PCT/US2023/018512 mailed Aug. 2, 2023 (8 pages).

* cited by examiner

*Primary Examiner* — Imani N Hayman
*Assistant Examiner* — Ross Terry Mularski
(74) *Attorney, Agent, or Firm* — Lerner David LLP

(57) ABSTRACT

A patch panel, including a front portion for accommodating a plurality of front side ports, and a back portion for accommodating one or more back side ports and for storing one or more extension cables; and one or more inner cables for connecting at least one of the front side ports to at least one of the back side ports, wherein the patch panel is configured such that when the patch panel is placed in a rack, the front side ports are proximate a first side of the rack, and the back side ports are proximate a second side of the rack, the first side of the rack and the second side of the rack being opposite, or substantially opposite, one another.

22 Claims, 19 Drawing Sheets

Front

Back

Front

Back

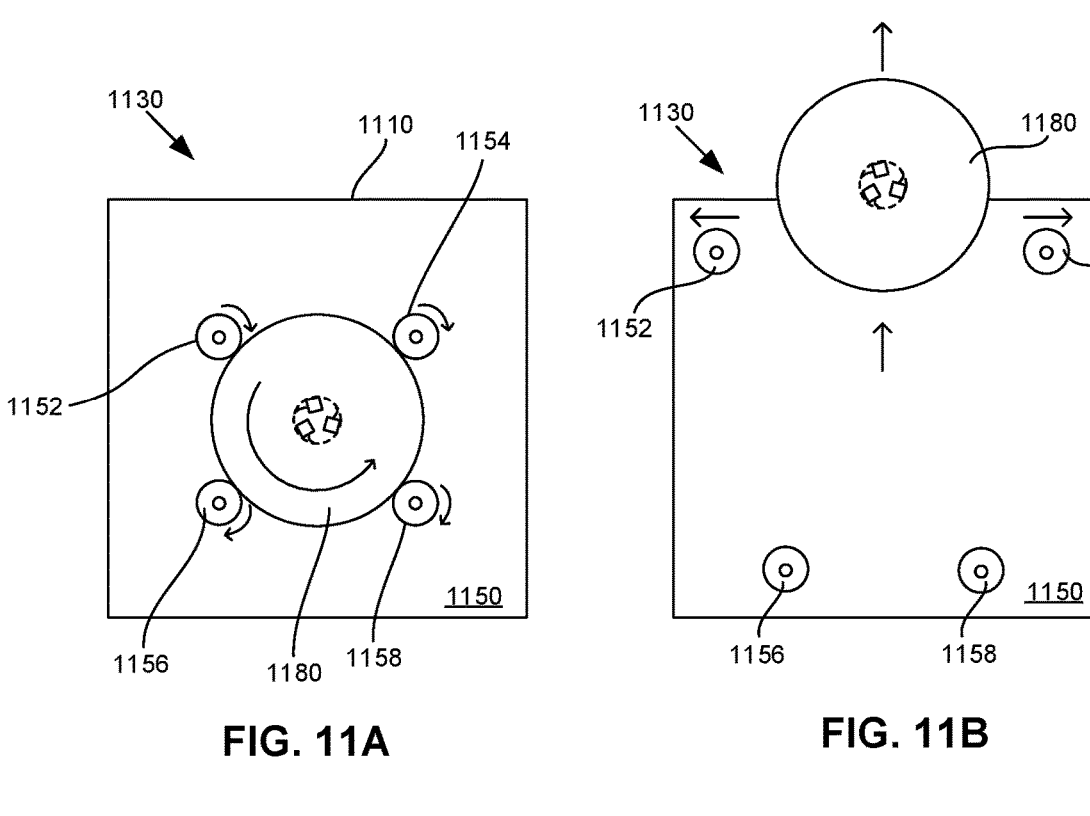
FIG. 11A
FIG. 11B
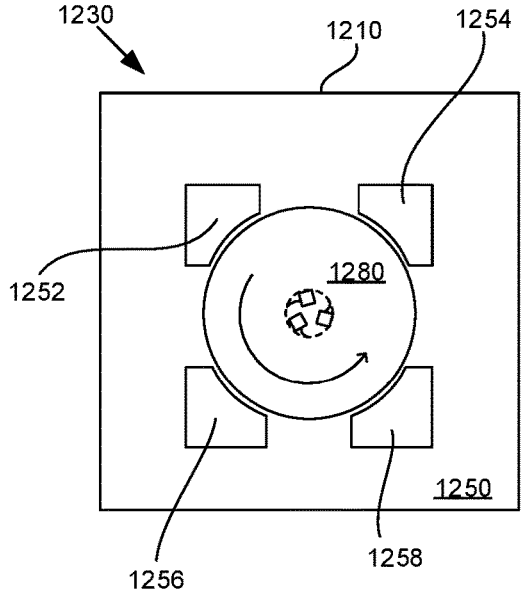
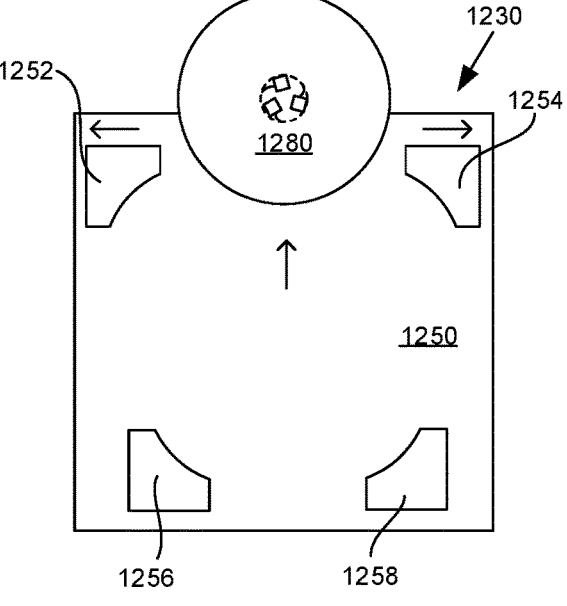
FIG. 12A
FIG. 12B

PATCH PANEL WITH EXTENSION CABLE STORAGE

CROSS-REFERENCE TO RELATED APPLICATION

The present application claims the benefit of the filing date of U.S. Provisional Application No. 63/330,383, filed on Apr. 13, 2022, the disclosure of which is hereby incorporated herein by reference.

BACKGROUND

Modules such as patch panels are widely used in electronic networks to monitor, interconnect and test circuits. A patch panel generally includes a two-sided array of connection ports that are adapted to receive communication lines, such as fiber optic cables. The connection ports may themselves be two-sided, with a cable inserted on one side of a given connection port being communicatively coupled to a cable inserted on the other side of the same connection port.

Patch panels are often mounted in a rack along with other patch panels. In such configurations, connections between panels may be provided through the use of external cables that are long enough to connect the panels but not so long as to be unwieldly. However, on occasion it may be necessary to connect a patch panel to a distant device, such as another patch panel that is mounted in a remotely positioned rack. Thus, there is a need to store lengths of cable sufficient to provide for any remote panel connections that may become necessary, and a need to manage the long cable runs required for remote panel connections.

BRIEF SUMMARY

It has been recognized that there is a need to efficiently provide for hard-wired connection of rack-mounted units to distant devices. In view of the need to efficiently provide for hard-wired connection of rack-mounted units to distant devices, the technology described in this disclosure is provided.

In accordance with an aspect of the presently disclosed technology, a patch panel is provided, including an enclosure having a front portion for accommodating a plurality of front side ports, and a back portion for accommodating one or more back side ports and for storing one or more extension cables; and one or more inner cables for connecting at least one of the front side ports to at least one of the back side ports, wherein the enclosure is configured such that when the patch panel is placed in a rack, the front side ports are proximate a first side of the rack, and the back side ports are proximate a second side of the rack, the first side of the rack and the second side of the rack being opposite, or substantially opposite, one another, and wherein the one or more extension cables include one or more connectors configured to connect with one or more of the back side ports. In accordance with another aspect of the presently disclosed technology, a patch panel is provided, including a rack attachment mechanism for movably securing the patch panel to a rack; a front portion for accommodating a plurality of front side ports; a back portion for accommodating one or more back side ports and for storing one or more extension cables; and one or more inner cables for connecting at least one of the front side ports to at least one of the back side ports, wherein the patch panel is configured such that when the patch panel is placed in the rack, the front portion is proximate a first side of the rack, and the back portion is proximate a second side of the rack, the first side of the rack and the second side of the rack being opposite, or substantially opposite, one another.

In accordance with yet another aspect of the presently disclosed technology, a patch panel is provided inclusive of a spool supportable on the patch panel without a center spindle. Put another way, the patch panel does not require a center spindle. The patch panel may include a plurality of spool supports, such as rollers, attached to a tray of the patch panel, the plurality of rollers being positionable on the tray to hold the spool therebetween. Alternatively, the patch panel may include a plurality of supports each with inward-facing surfaces having a shape complementary to an outer lateral surface of the spool. Such inward-facing surfaces on the supports may be treated or otherwise be made of materials to reduce friction with any objects in contact with the surfaces, such as the spool. In the above-described patch panel, the spool may be removed from and inserted into a remainder of the patch panel without moving the tray. In this manner, the spool is removable as a singular construct. To remove the spool at least one of the spool supports is translated or otherwise temporarily removed from its position on the tray that holds the spool in place, thereby making the spool accessible for removal. A reverse of this process is performed to re-store the spool within the patch panel. The patch panel may further include a rack attachment mechanism for movable attachment to a rack. The patch panel may include a front portion for accommodating a plurality of front side ports; and a back portion for storing one or more extension cables. Either the front portion or the back portion may accommodate one or more back side ports and one or more inner cables for connecting at least one of the front side ports to at least one of the back side ports. The patch panel may be configured such that when the patch panel is placed in the rack, the front portion is proximate a first side of the rack, and the back portion is proximate a second side of the rack, the first side of the rack and the second side of the rack being opposite, or substantially opposite, one another.

BRIEF DESCRIPTION OF THE DRAWINGS

The accompanying drawings are not intended to be drawn to scale. Also, for purposes of clarity not every component may be labeled in every drawing.

FIGS. 11A-11B are plan views of a patch panel of an embodiment showing how a spool within the patch panel may be stored and accessed.

FIGS. 12A-12B are plan views of a patch panel of an embodiment showing how a spool within the patch panel may be stored and accessed.

DETAILED DESCRIPTION

Examples of systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
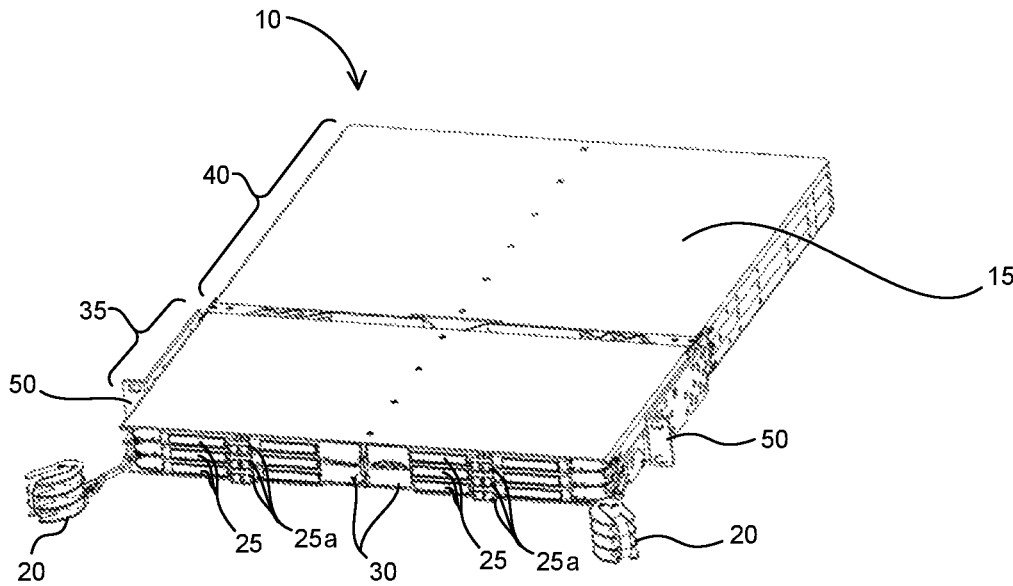
FIG. 1 is a perspective view of a patch panel of an embodiment.

FIG. 1 is a perspective view of a patch panel 10 of an embodiment. The patch panel 10 includes an enclosure 15, cable hangers 20 for securing cables running to and from the patch panel 10, a plurality of slidable trays 25 having respective handles 25a, and doors 30 for securing the slidable trays 25 within the enclosure 15. The enclosure has a front portion 35 and a back portion 40. The front portion 35 accommodates a multiple of front side ports (not shown), and the back portion 40 accommodates a multiple of back side ports (not shown). Regarding the front side ports, they are positioned within sliding trays 25. To access the ports in one of trays 25, the tray is pulled outward from the front portion 35 by means of a corresponding one of handles 25a and then opened to expose the ports.

The ports may take the form of adaptors. For example, each port may be a fiber optic adaptor having two ends, a first end configured to accept a first fiber optic cable connector, and a second end configured to accept a second fiber optic cable connector, such that the first fiber optic cable connector and the second fiber optic cable connector are communicatively coupled. In this manner, fiber optic signals may be communicated between a cable coupled to the first fiber optic cable connector and a cable coupled to the second fiber optic cable connector.

It should be noted that adaptors are merely one possible port configuration applicable to the presently disclosed technology. The wide range of applicable port configurations that may be used will be readily appreciated by one skilled in the art upon review of this disclosure.

It should be further noted that in some embodiments the patch panel 10 is configured such that the enclosure 15 has a size of one rack unit (1 RU). While in other embodiments, the patch panel 10 is configured such that the enclosure 15 has a size of less than 1 RU or more than 1 RU. Further, in some embodiments the patch panel 10 may be equipped with brackets for mounting to a rack. For example, the patch panel 10 may include brackets 50 for mounting the patch panel 10 to a two post rack or a four post rack.

Figure 2:
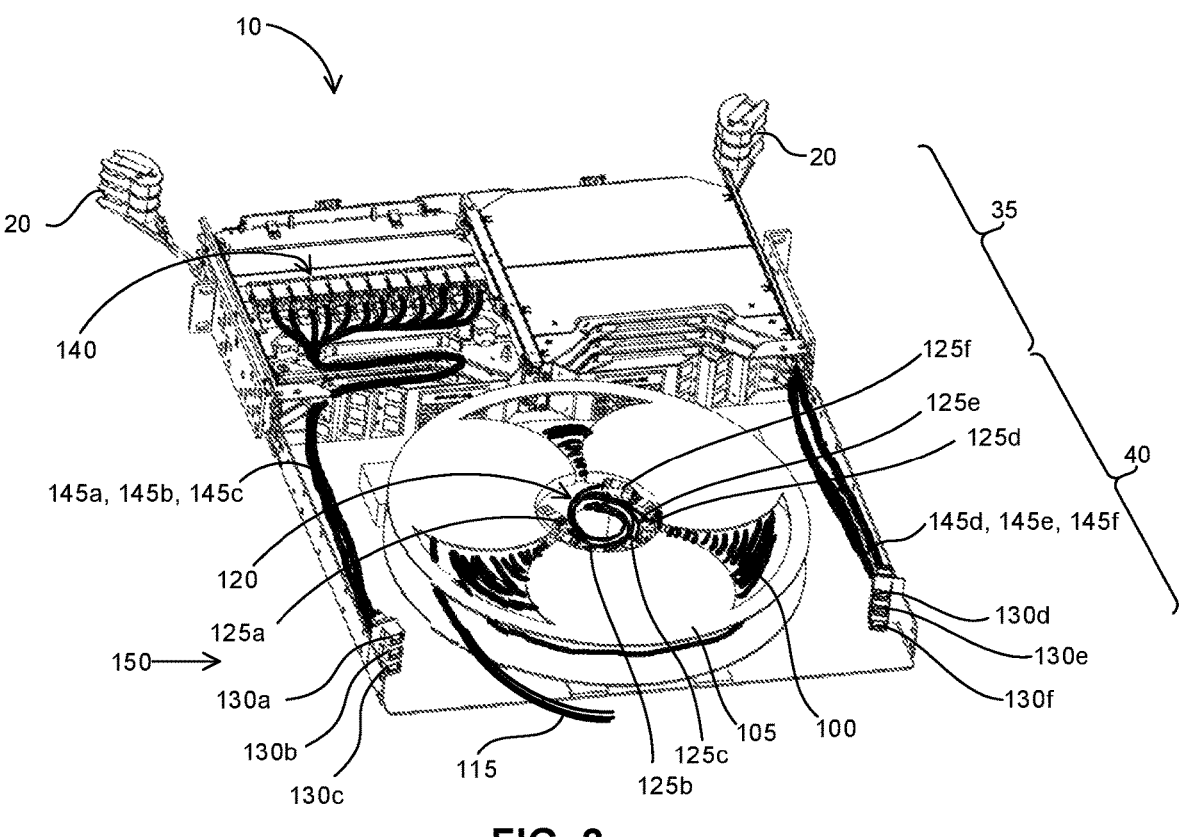
FIG. 2 is a cutaway view of the patch panel of FIG. 1, with extension cables on a spool inside the patch panel.

Turning now to FIG. 2, the figure is a cutaway view of the patch panel 10 of FIG. 1, with extension cables 100 on a spool 105 inside the patch panel 10. As can be seen from FIG. 2, the extension cables 100 may be six individual cables including extending ends 115 and staying ends 120. In the depicted configuration, the extending ends 115 do not include connectors, while the staying ends 120 include respective connectors 125a, 125b, 125c, 125d, 125e, and 125f. The connectors 125a-125f are formed so as to respectively couple with back side ports 130a, 130b, 130c, 130d, 130e, and 130f of the patch panel 10. In the depicted configuration, back side ports 130a-130c are coupled to a multiple of front side ports 140 by respective inner break out cables 145a, 145b, and 145c, with each of break out cables 145a-145c connecting one of back side ports 130a-130c with four of the front side ports 140. Similarly, the back side ports 130d-130f are coupled to a multiple of front side ports (not shown) by respective inner break out cables 145d, 145e, and 145f.

The back side ports 130a-130f are located proximate a back end 150 of the back portion 40 of enclosure 15. In this manner, the back side ports 130a-130f are readily accessible.

In particular, when the back side ports 130a-130f are arranged proximate the back end 150, one can manually access the back ports 130a-130f to insert connectors 125a-125f, without having to remove the patch panel 10 from a rack and without having to disassemble any portion of the patch panel 10. Thus, for example, when patch panel 10 is placed in a two post or four post rack, a technician may move to a first side of the rack (e.g., a front side of the rack), to access front ports 140, and move to a second side of the rack, (e.g., a back side of the rack) to access back side ports 130a-130f by hand and without disassembling any portion of the patch panel 10. The first side of the rack and the second side of the rack may be opposite, or substantially opposite, one another. Moreover, the first side of the rack may be the front side of the rack, and the second side of the rack may be the back side of the rack.

Several notes should be made regarding the configuration depicted in FIG. 2. For one, it is noted that while the FIG. 2 configuration does not include connectors on extending ends 115 of the extension cables 100, other configurations may include a connector on each extending end, on some but not all extending ends, or on one extending end. Also, it is noted that back side ports 130a-130c are shown as integrated into a single multi-fiber push on (MPO) connector but may take other forms. For example, ports 130a-130c may be respectively formed as distinct individual ports. In the same manner, back side ports 130d-130f are shown as integrated into a single MPO connector but may take other forms, such as being respectively formed as distinct individual ports. Further, inner cables 145a-145f do not need to be formed as a multiple of breakout cables. Rather, a single breakout cable may be provided to couple all of the cables from the front side ports 140 to a single back side port. Or there may be a one-to-one correspondence between cables from the front side ports 140 and the back side ports, such that an individual inner cable is provided to connect each front side port 140 to a respective back side port. Still further, the extension cables 100 are not restricted to six individual cables. Rather, a wide range of extension cable types and extension cable combinations may be employed. For example, the extension cables 100 may be one cable instead of a multiple of cables, may be a single cable that includes many individual cables within a single cable jacket, may be one or more breakout cables, or may be a combination of two or more different cable types.

Further, it is noted that while FIG. 2 shows the extension cables 100 on a spool 105, other configurations are possible. For instance, the extension cables 100 may be stored inside the patch panel 10 without a spool and without being secured to each other, or without a spool and being secured to each other using one or more cable ties. The wide range of alternatives for storing the extension cables 100 inside the patch panel 10 will be readily appreciated by the skilled person upon reading this disclosure.

Having described the configuration of FIGS. 1 and 2, a use of the configuration will now be described.

Figures 3A, 3B:
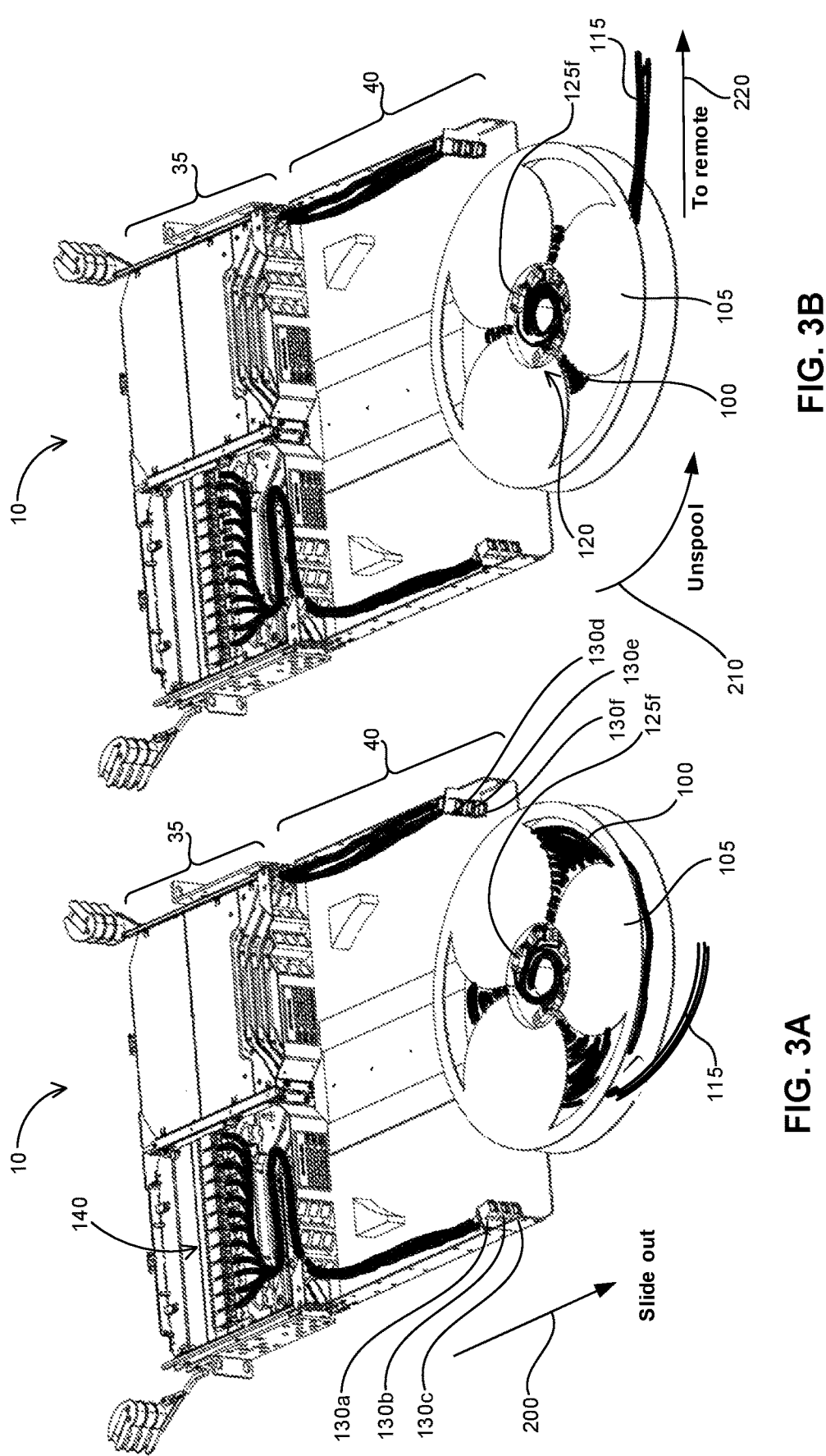
FIG. 3A is a cutaway view of the patch panel of FIG. 2 with the spool and extension cables partially removed from the patch panel.
FIG. 3B is a cutaway view of the patch panel of FIG. 2 with the spool and extension cables partially removed from the patch panel, and the extension cable partially unwound from the spool.

A shown in FIG. 3A, as an initial step to using the extension cables 100, the spool 105 with extension cables 100 may be slid out from the back portion 40 of enclosure 15, as indicated by arrow 200. Then, after removal from the back portion 40, the extension cables 100 may be unspooled from the spool 105. FIG. 3B depicts unspooling of the extension cables 100 by arrow 210, with the extending ends 115 being moved toward a remote device, as indicated by arrow 220, while the staying ends 120 remain within the spool 105.

Figures 4A, 4B:
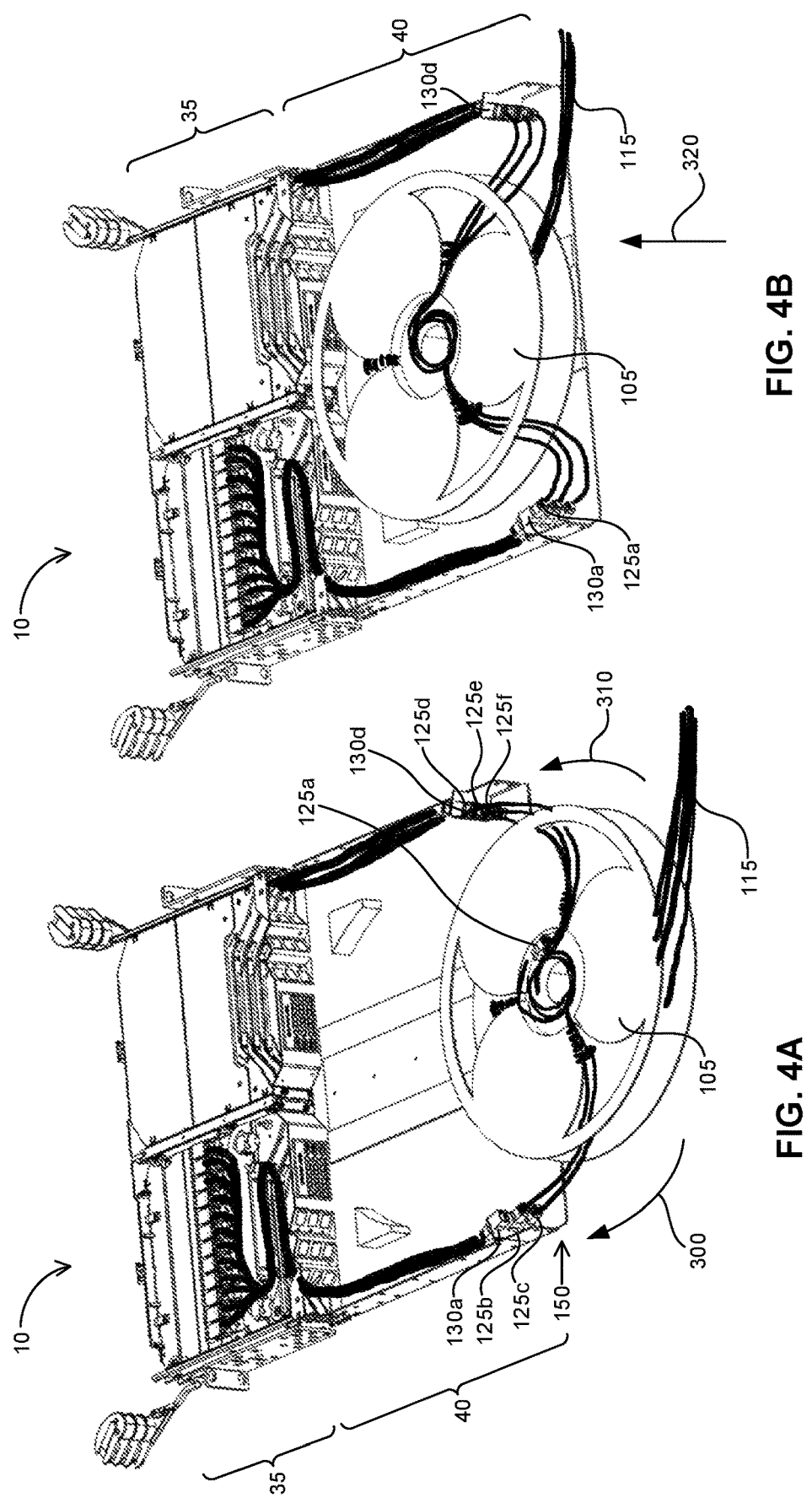
FIG. 4A is a cutaway view of the patch panel of FIG. 2 with the spool and extension cables partially removed from the patch panel, the extension cables unwound from the spool, a first group of extension cable ends coupled to a first group of back side ports, and a second group of extension cable ends coupled to a second group of back side ports.
FIG. 4B is a cutaway view of the patch panel of FIG. 2 with the spool and extension cables inside the patch panel, the extension cables unwound from the spool, a first group of extension cable ends coupled to a first group of back side ports, and a second group of extension cable ends coupled to a second group of back side ports.

After the extension cables 100 are unspooled from the spool 105, the staying ends 120 may be picked from the spool 105 and connected to respective ones of the back side ports 130a-130f. FIG. 4A shows the patch panel 10 with spool 105 removed from the back portion 40 of enclosure 15, and with connectors 125b-125f of staying ends 120 being respectively connected to back side ports 130b-130f. The connections between connectors 125b-125f and back side ports 130b-130f may be made by hand since the spool can be removed from the back portion 40 and the back side ports 130b-130f are positioned at the back end 150 of the back portion 40. The manual connection of connectors 125b and 125c to back side ports 130b and 130c is depicted by arrow 300, and the manual connection of connectors 125d-125f to back side ports 130d-130f is depicted by arrow 310.

Once all desired connections between connectors 125a-125f and back side ports 130a-130f have been made, the spool 105 may be moved back into the back portion 40 of enclosure 15. FIG. 4B shows the patch panel 10 after the extension cables 100 have been unspooled from spool 105, the extending ends 115 have been extended toward a remote device, connectors 125a-125f have been respectively connected to back side ports 130a-130f, and spool 105 has been placed back into the back portion 40 of enclosure 15. The placement back into back portion 40 is indicated by arrow 320.

Figure 5A:
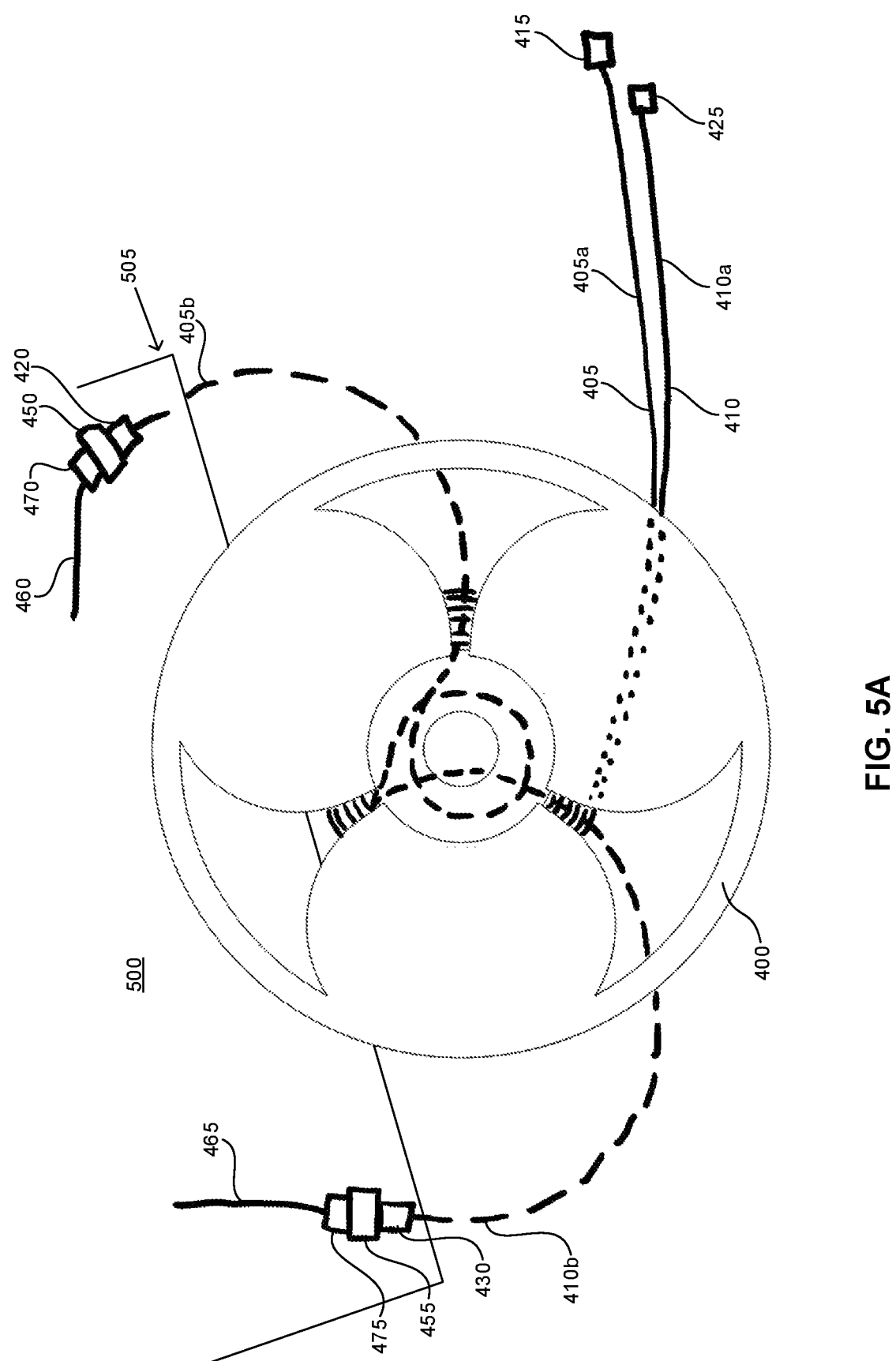
FIG. 5A is a plan view of a spool and extension cables according to an embodiment, with the extension cables connected to respective back side ports of a patch panel.

Turning now to FIG. 5A, the figure shows a plan view of an embodiment including a spool 400, an extension cable 405, and an extension cable 410. As can be seen from the figure, extension cable 405 is partially unwound from spool 400 and includes an extending end 405a and a staying end 405b. Similarly, extension cable 410 is partially unwound from spool 400 and includes an extending end 410a and a staying end 410b. Further extension cable 405 includes an extending end connector 415 and a staying end connector 420, while extension cable 410 includes and extending end connector 425 and a staying end connector 430. Extension cable 405 is shown coupled to a back side port 450, and extension cable 410 is shown coupled to a back side port 455. The back side ports 450 and 455 are, in turn, respectively coupled to inner cables 460 and 465 via inner cable connectors 470 and 475.

The back side ports 450 and 455 are affixed to a back portion 500 of a patch panel, and are affixed at a back end 505 of the back portion 500, or proximate the back end 505 of the back portion 500. Nevertheless, in other configurations, the back side ports 450 and 455 are not affixed to a back end of a patch panel, and are extendable from the a back portion of a patch panel while remaining connected to the patch panel via inner cables 460, 465 and inner cable connectors 470, 475.

In addition, it should be noted that the extending end 405a and the extending end 410a of the FIG. 5A configuration may be extended to a single remote device or may be extended to different remote devices. As another alternative, one of the extending ends 405a and 410a may be extended to a remote device, while the other of the extending ends 405a and 410a is not extended to a remote device.

Figure 5B:
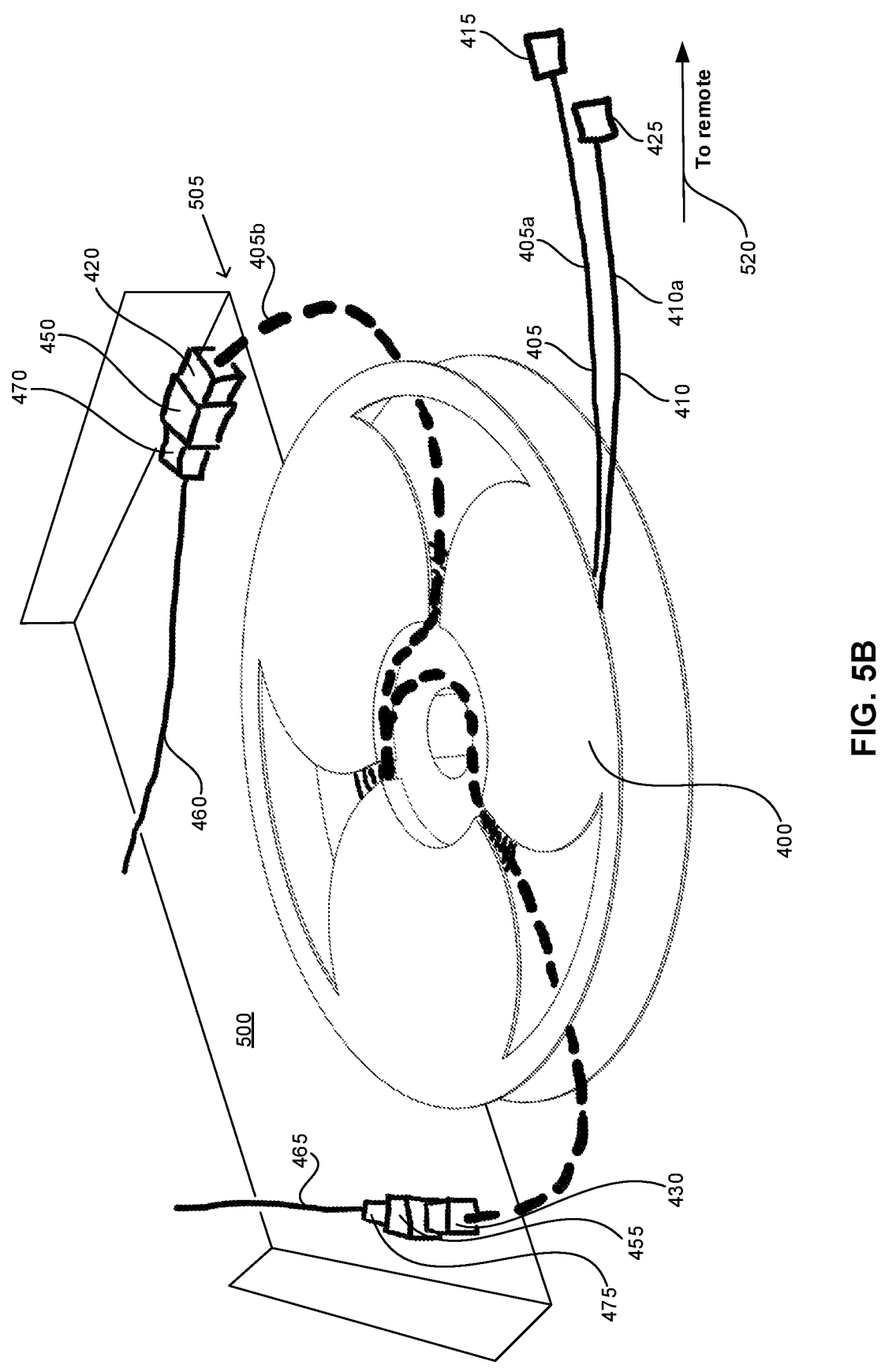
FIG. 5B is a perspective view of the spool and extension cables of FIG. 5A.

FIG. 5B shows a perspective view of the spool 400 and extension cables 405, 410 of FIG. 5A. In the FIG. 5B depiction, an arrow 520 shows the extending ends 405a, 410a and the extending end connectors 415, 425 extending toward a single remote device.

Figure 5C:
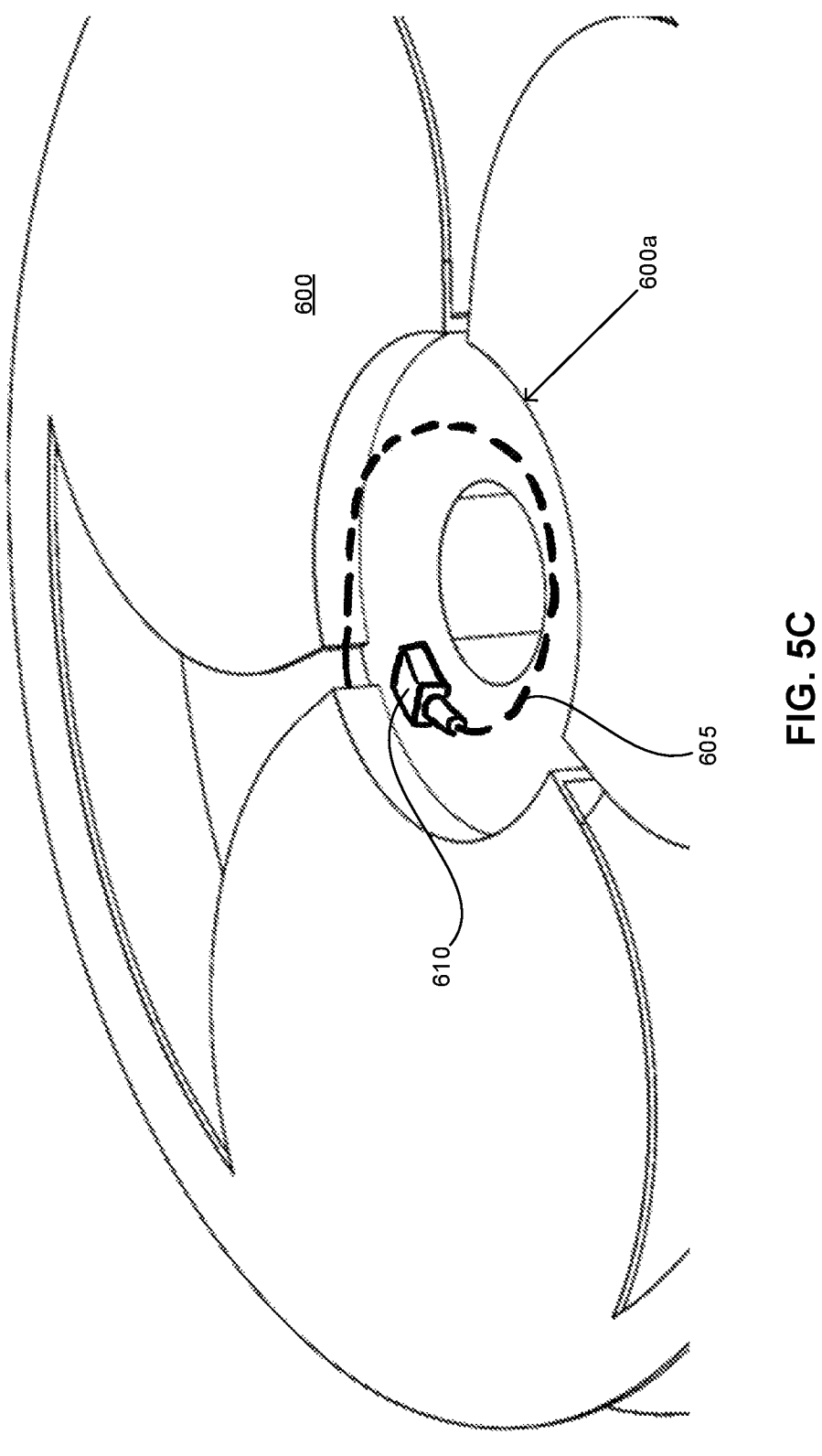
FIG. 5C is detailed perspective view of a spool and a staying end of an extension cable, with the staying end including a connector.

FIG. 5C is detailed perspective view of a configuration of a cable spool 600, a staying end 605 of an extension cable, and a staying end connector 610, which may be included in a patch panel of an embodiment. The figure shows how the staying end 605 and the staying end connector 610 may be positioned at an inner portion 600*a* of spool 600. In this manner, the staying end connector 610 may be manually selected from the inner portion 600*a* for connection to a back side port (not shown) of the patch panel.

Figure 6A:
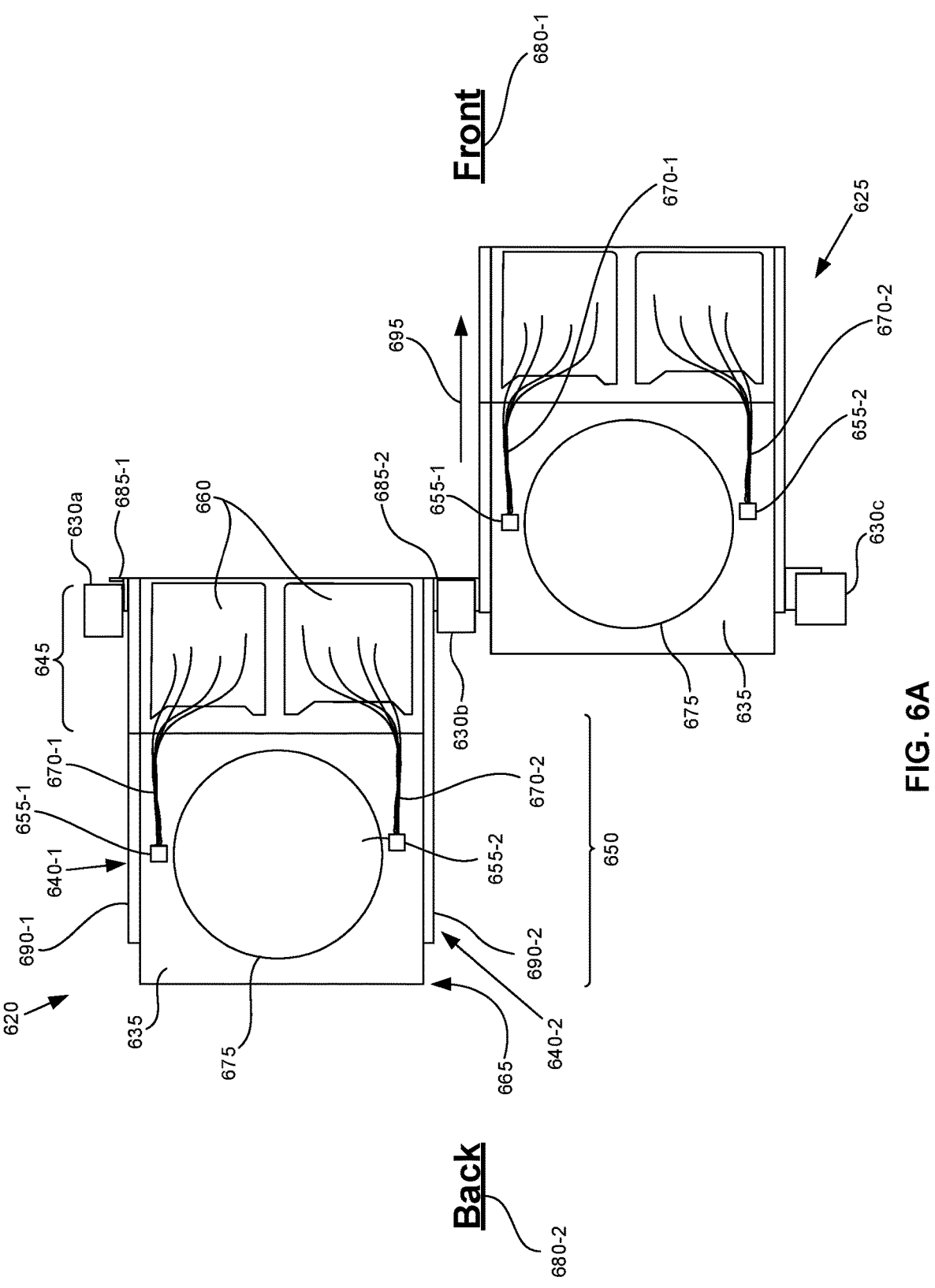
FIG. 6A is a plan view of two patch panels of an embodiment, the two patch panels being accommodated within a rack.

Turning now to FIG. 6A, the figure is a plan view of a first patch panel 620 and a second patch panel 625 of an embodiment. The patch panels 620 and 625 are shown as accommodated within a rack having rack posts 630*a*, 630*b*, and 630*c*. Each of the patch panels 620 and 625 includes a base 635. The base 635 may be part of an enclosure or may not be part of an enclosure. That is, the patch panels 620 and 625 may include an enclosure of which the base 635 is a part, or the patch panels 620 and 625 may include the base 635 apart from any other enclosure portions. For example, an enclosure of the patch panel 620 may include the base 635, a first side portion (not shown) at a first side 640-1 of the base 635, and a second side portion (not shown) at a second side 640-2 of the base 635. Further, such enclosure may include a cover (not shown), with elements of the patch panel 620 positioned between the base 635 and the cover.

In any event, each of the patch panels 620 and 625 include a front portion 645 and a back portion 650. The front portion 645 accommodates a multiple of front side ports (not shown) which may, for example, be the same as or similar to the front side ports 140 of FIG. 2; and the back portion 650 accommodates a first back side port 655-1 and a second back side port 655-2, the back side ports 655-1 and 655-2 being, for example, the same as or similar to the back side ports 130*a*-130*f* of FIG. 2. Regarding the front side ports, they may be positioned within sliding trays 660 which may, for example, be the same as or similar to the sliding trays 25 of FIG. 1. Regarding the back side ports 655-1 and 655-2, they may be movable, at least, in a direction toward a back end 665 of the back portion 650 and in a direction away from the back end 665 of the back portion 650. The back side ports 655-1 and 655-2, whether or not they are movable, may be positioned proximate the back end 665 of patch panels 620 and/or 625 such that the back side ports 655-1 and 655-2 are accessible by hand. Moreover, it should be noted while the patch panels 620 and 625 are shown having multiple back side ports, either or both of the patch panels 620 and 625 may have one back side port only, or one group of back side ports only.

The patch panels 620 and 625 also respectively include one or more inner cables 670-1 and 670-2 for connecting at least one of the front side ports to at least one of the back side ports 655-1 and 655-2. The inner cables 670-1 and 670-2 may, for example, be the same as or similar to the inner cables 145*a*-145*f* of FIG. 2.

Further, the patch panels 620 and 625 may store extension cables in their respective back portions 650. The patch panels 620 and 625 may store extension cables, for example, like those described in connection with FIGS. 2-5C, and in the same manner as described in connection with FIGS. 2-5C. To illustrate such extension cable storage, FIG. 6A shows each of the patch panels 620 and 625 including a cable spool 675.

The patch panels 620 and 625 are configured to slidably engage with the rack. In FIG. 6A, the patch panels 620 and 625 are shown in slidable engagement with the rack posts 630*a*, 630*b*, and 630*c* of the rack such that the patch panels 620 and 625 can translate between positions toward a front side 680-1 of the rack and positions toward a back side 680-2 of the rack. To provide for such slidable engagement, the patch panel 620, for example, has a rack attachment mechanism that includes at least two brackets 685-1 and

685-2 for attaching respectively to rack posts 630*a* and 630*b*, and at least two sliding portions 690-1 and 690-2 for slidably engaging with respective ones of the at least two brackets 685-1 and 685-2. Either or both of the patch panels 620 and 625 may be placed in the rack with the front portions 645 proximate the front side 680-1 of the rack, and the back portion 650 proximate the back side 680-2 of the rack. Then, either or both of the patch panels 620 and 625 may be slid toward the front side 680-1 of the rack, e.g., to facilitate access to the extension cables and back side ports 655-1 and 655-2, as illustrated by arrow 695. In FIG. 6A, the patch panel 625 shown as slid toward the front side 680-1 of the rack. The patch panel 625 may be slid from the depicted position toward the back side 680-2 of the rack, e.g., after the extension cables and back side ports 655-1 and 655-2 have been accessed. Two illustrative access schemes for extension cables and back side ports 655-1 and 655-2 are illustrated in FIG. 6B.

Figure 6B:
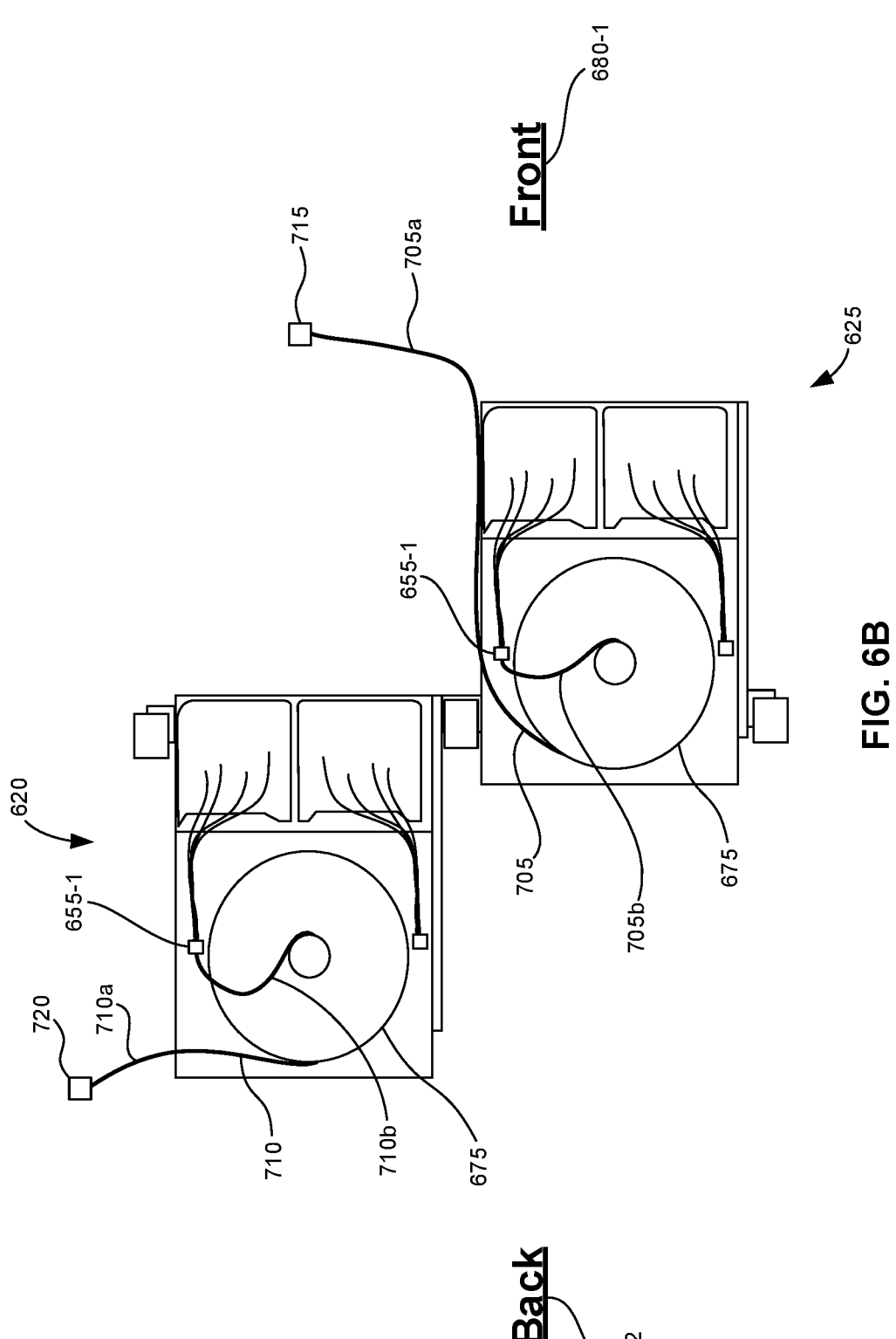
FIG. 6B is a plan view of the FIG. 6A configuration demonstrating access to extension cables of the patch panels from the front of the rack and from the back of the rack.

FIG. 6B is a plan view of the FIG. 6A configuration demonstrating access to extension cables of the patch panels 620 and 625 from the front side 680-1 of the rack and from the back side 680-2 of the rack. In FIG. 6B, an extension cable 705 stored in patch panel 625 is accessed from the from the front side 680-1 of the rack, and an extension cable 710 stored in patch panel 620 is accessed from the back side 680-2 of the rack. The extension cable 705 is stored on the spool 675 accommodated within the patch panel 625 and includes an extending end 705*a* having an extending end connector 715 and a staying end 705*b*. The staying end 705*b* is shown coupled to back side port 655-1, the coupling being implemented with or without a connector on staying end 705*b*. The extension cable 710 is stored on the spool 675 accommodated within the patch panel 620 and includes an extending end 710*a* having an extending end connector 720 and a staying end 710*b*. The staying end 710*b* is shown coupled to back side port 655-1, the coupling being implemented with or without a connector on staying end 710*b*.

Figures 7A, 7B, 7C:
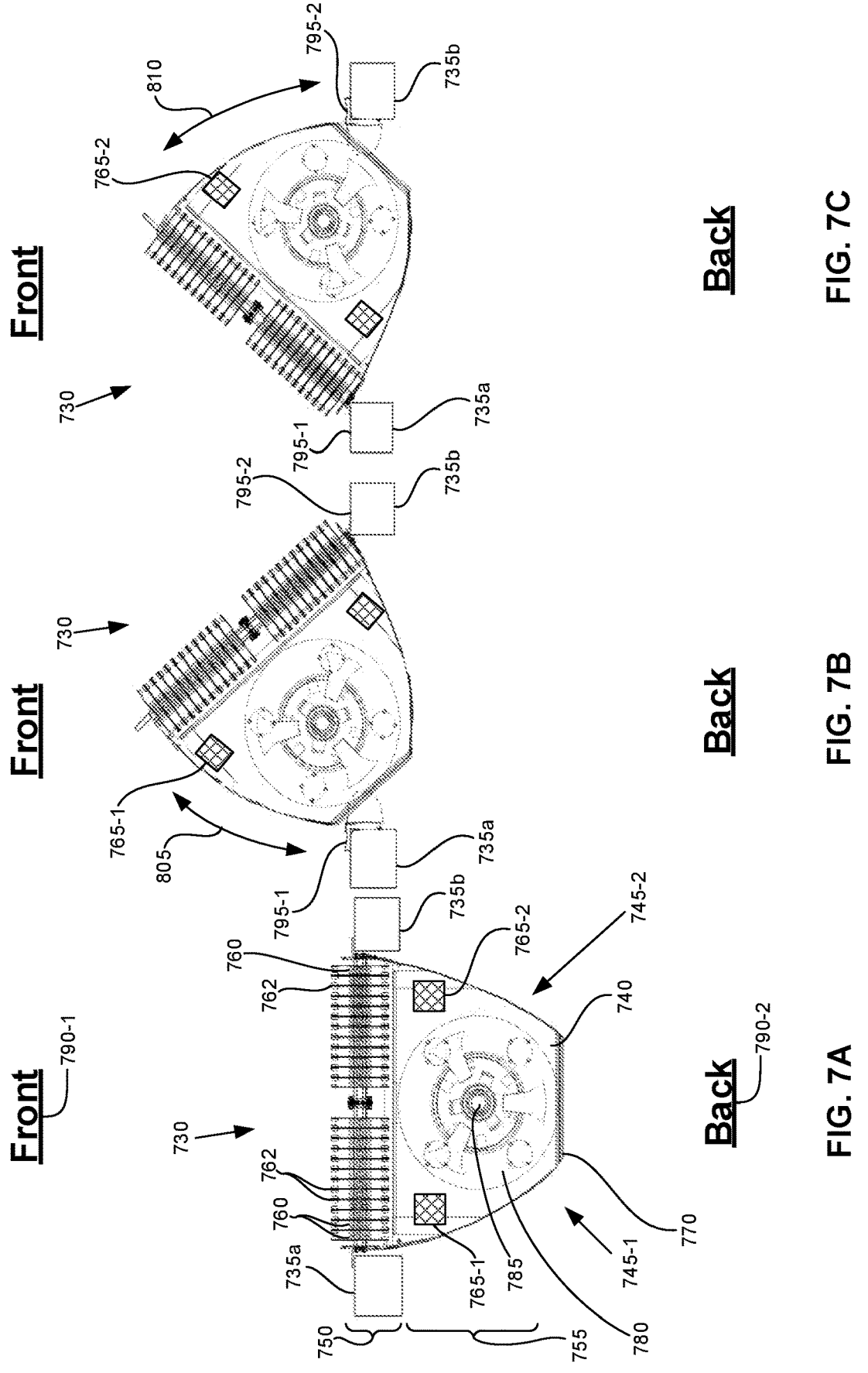
FIGS. 7A-7C are plan views of a patch panel of an embodiment accommodated within a rack, showing how the patch panel may be rotated about posts of the rack.

Referring now to FIG. 7A, the figure is a plan view of a patch panel 730 of an embodiment accommodated within a rack having rack posts 735*a* and 735*b*. The patch panel 730 may be rotated about either of the rack posts 735*a* and 735*b*. FIG. 7B is a plan view showing the patch panel 730 rotated about rack post 735*b*, clockwise relative to the position of patch panel 730 in FIG. 7A. FIG. 7C is a plan view showing the patch panel 730 rotated about rack post 735*a*, counter-clockwise relative to the position of patch panel 730 in FIG. 7A.

The patch panel 730 includes a base 740. The base 740 may be part of an enclosure or may not be part of an enclosure. That is, the patch panel 730 may include an enclosure of which the base 740 is a part, or the patch panel 730 may include the base 740 apart from any other enclosure portions. For example, an enclosure of the patch panel 730 may include the base 740, a first side portion (not shown) at a first side 745-1 of the base 740, and a second side portion (not shown) at a second side 745-2 of the base 740. Further, such enclosure may include a cover (not shown), with elements of the patch panel 730 positioned between the base 740 and the cover.

In any event, the patch panel 740 includes a front portion 750 and a back portion 755. The front portion 750 accommodates a multiple of front side ports 760, which may, for example, be the same as or similar to the front side ports 140 of FIG. 2. The front portion 750 may also include port label arms 762 that are proximate the front side ports 760 and serve to display identifying labels for the front side ports 760. The back portion 755 accommodates a first back side port 765-1 and a second back side port 765-2 which may, for example, be movable and be the same as or similar to back side ports 655-1 and 655-2 of FIG. 6A. The back side ports 765-1 and 765-2 may be movable, at least, in a direction toward a back end 770 of the back portion 755 and in a direction away from the back end 770 of the back portion 755. The back side ports 765-1 and 765-2, whether or not they are movable, may be positioned proximate the back end 770 of patch panel 730 such that the back side ports 765-1 and 765-2 are accessible by hand. Moreover, it should be noted while the patch panel 730 is shown having multiple back side ports, the patch panel 730 may have one back side port only, or one group of back side ports only.

As can be further seen from FIGS. 7A-7C, the first side 745-1 of the base 740 and the second side 745-2 of the base 740 may be tapered in a direction generally from the front portion 750 of the patch panel 730 to the back portion 755 of the patch panel. The tapering is provided to facilitate rotation of the patch panel 730 about rack posts 735*a* and 735*b*. However, it should be noted that some embodiments may include only one tapered side, or may have no tapered sides. Also, it should be noted that for embodiments that include enclosure elements in addition to base 740, the enclosure may have two tapered sides, one tapered side, or no tapered sides.

Figures 8A, 8B:
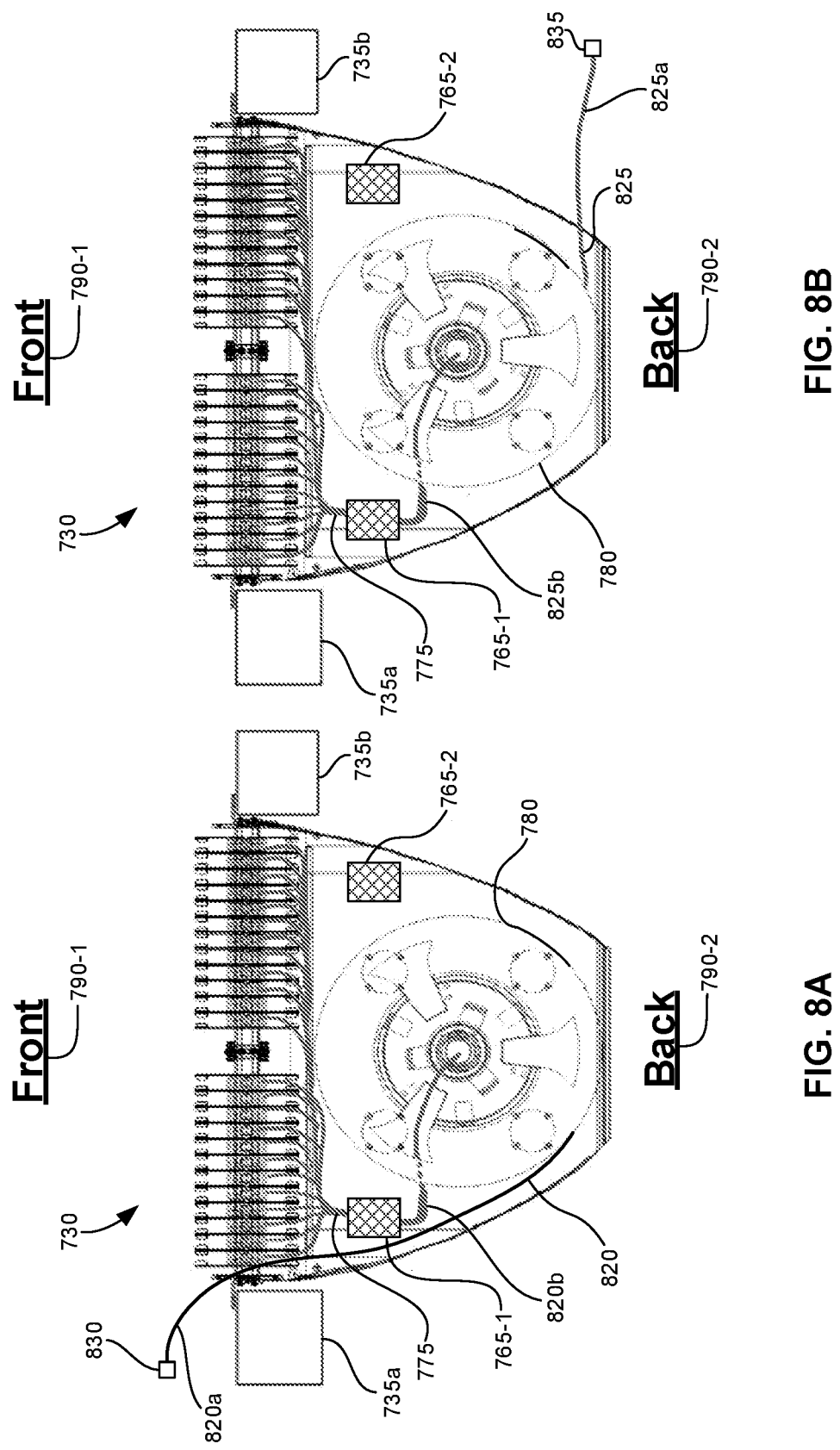
FIG. 8A is a plan view of the configuration of FIGS. 7A-7C demonstrating access to an extension cable of the patch panel from the front of the rack.
FIG. 8B is a plan view of the configuration of FIGS. 7A-7C demonstrating access to an extension cable of the patch panel from the front of the rack.

Also, the patch panel 730 may include one or more inner cables for connecting at least one of the front side ports 760 to at least one of the back side ports 765-1 and 765-2. By way of illustration, FIGS. 8A and 8B show inner cables 775 connecting front side ports 760 to back side port 765-1. In any case, the inner cables may, for example, be the same as or similar to the inner cables 145*a*-145*f* of FIG. 2.

Further, the patch panel 730 may store extension cables in its back portion 755. The patch panel 730 may store extension cables, for example, like those described in connection with FIGS. 2-5C, and in the same manner as described in connection with FIGS. 2-5C. To illustrate such extension cable storage, FIGS. 7A-7C show the patch panel 730 including a cable spool 780. The cable spool 780 may be accommodated on a spindle 785 that is attached to, or integral with, the base 740.

The patch panel 730 is configured to rotatably engage with the rack. As can be seen from FIGS. 7A-7C, the patch panel 730 may be placed in the rack with the front portion 750 of the patch panel 730 proximate a front side 790-1 of the rack, and the back portion 755 of the patch panel 730 proximate a back side 790-2 of the rack. As can be further seen from FIGS. 7A-7C, the patch panel 730 has a rack attachment mechanism that includes two pivot mechanisms 795-1 and 795-2 for movably securing the patch panel 730 to respective posts 735*a* and 735*b* of the rack so that the patch panel 730 is rotatable about the posts 735*a* and 735*b*. By way of example, the pivot mechanisms 795-1 and 795-2 may include respective hinges, each hinge being releasably attachable to a respective post 735*a* and 735*b* and allowing the patch panel 730 to rotate about the post 735*a* or 735*b* when the hinge is attached to the post 735*a* or 735*b*. Rotatability of the patch panel 730 about rack post 735*b* is illustrated in FIG. 7B. Rotatability of the patch panel 730 about rack post 735*a* is illustrated in FIG. 7C.

The patch panel 730 may be rotated about rack post 735*a* or 735 to facilitate access to the extension cables and back side ports 765-1 and 765-2. In FIG. 7B, rotating movement of the patch panel 730 is illustrated by arrow 805, with the patch panel 730 shown rotated clockwise about rack post 735*b*. After the extension cables and back side ports 765-1 have been accessed, the patch panel 730 may be rotated counterclockwise about rack post 735*b* from the depicted position. Similarly, in FIG. 7C, rotating movement of the patch panel 730 is illustrated by arrow 810, with the patch panel 730 shown rotated counterclockwise about rack post 735*a*. After the extension cables and back side ports 765-2 have been accessed, the patch panel 730 may be rotated clockwise about rack post 735*a* from the depicted position.

It should be noted that in alternative embodiments, the patch panel 730 does not include two pivot mechanisms. For example, the patch panel 730 may include a single pivot mechanism including a hinge for allowing the patch panel to rotate about one of the rack posts 735*a* and 735*b*.

Turning now to FIGS. 8A and 8B configurations demonstrating access to extension cables of the patch panels 730 are illustrated. In FIG. 8A, an extension cable 820 is accessed from the front side 790-1 of the rack. In FIG. 8B an extension cable 825 is accessed from the back side 790-2 of the rack. The extension cable 820 is stored on the spool 780 accommodated within the patch panel 730 and includes an extending end 820*a* having an extending end connector 830 and a staying end 820*b*. The staying end 820*b* is shown coupled to back side port 765-1, the coupling being implemented with or without a connector on staying end 820*b*. The extension cable 825 is stored on the spool 780 accommodated within the patch panel 730 and includes an extending end 825*a* having an extending end connector 835 and a staying end 825*b*. The staying end 825*b* is shown coupled to back side port 765-1, the coupling being implemented with or without a connector on staying end 825*b*.

Figure 9:
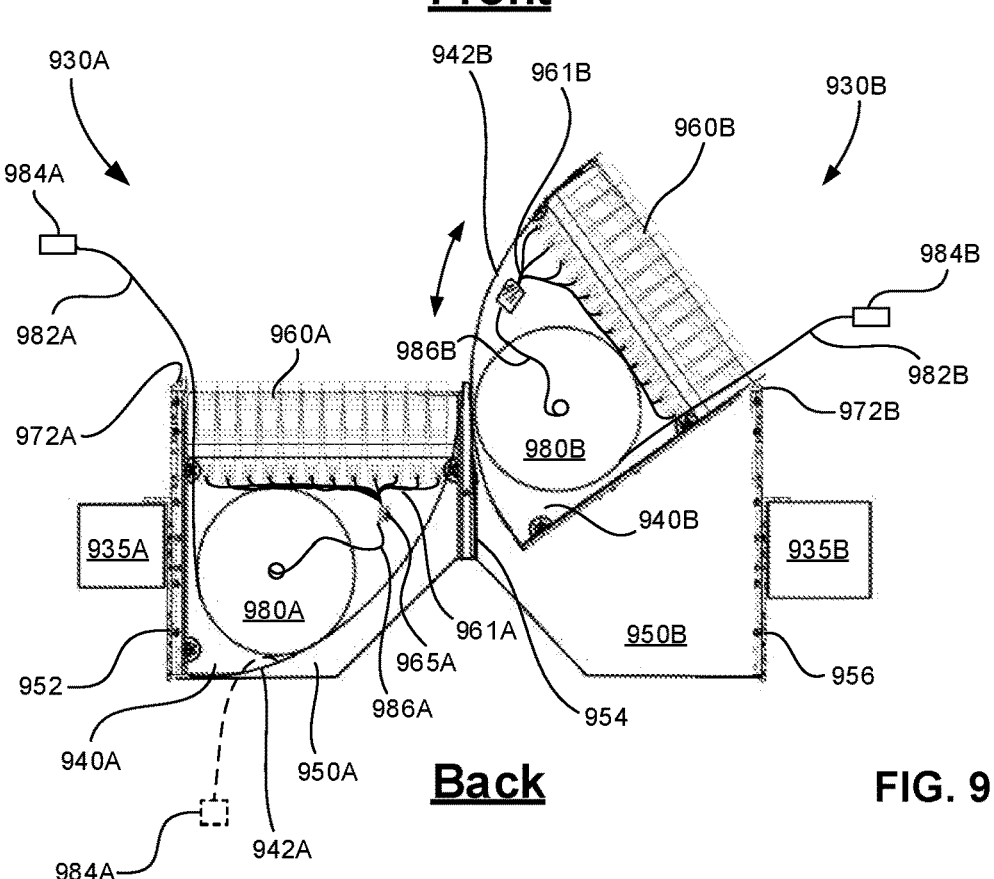
FIG. 9 is a plan view of a patch panel of an embodiment accommodated within a rack, showing how the patch panel may be rotated about walls of the rack.

Turning now to another embodiment, FIG. 9 shows a first patch panel 930A and a second patch panel 930B. Patch panels 930A, 930B are shown as accommodated within a rack having rack posts 935A, 935B. The patch panels respectively include trays 950A, 950B. Each tray 950A, 950B has a volume defined in part by walls. For tray 950A, these include walls 952, 954, and for tray 950B, these include walls 954, 956, wall 954 being shared by both trays. Among these walls, outer walls 952, 956 are configured to abut respective rack posts 935A, 935B and may be supported structurally by same. First panel 930A may have a structure that mirrors second panel 930B on an opposite side of central wall 954, and thus it should be appreciated that the following description of first panel 930A applies equally to second panel 930B, unless otherwise noted.

First patch panel 930A includes tray 950A, base 940A rotatably disposed thereon via an attachment to wall 952, where such rotatable attachment may be via hinge 972A, spool 980A disposed on base 940A, along with cable components. In one example, and as depicted in FIG. 9, such cable components may include front side ports 960A, back side port 965A, inner cables 961A connecting the front side and back side ports, and staying cable 986A connectable between the back side port and spool 980A. Cable components may also include extension cable 982A extending to an end connector 984A. Such extension cable may be arranged to extend out of a front side or a rear side of patch panel 930A. This is shown in FIG. 9, where solid lines indicate an extension out of the front side and phantom lines indicate an extension out of the back side.

In some examples, hinge 972A may be a hinge structure positioned at an end of wall 952. Base 940A may include an outer edge 942A having a curve defined by a single radius. The outer edge may extend around approximately 90 degrees of a full rotation about hinge 972A, and in this manner, base has a surface with a shape of a quarter of a circle. With the base having such a shape, base 940A is rotatable about 972A such that from a stored or storage position shown in FIG. 9, base 940A is rotated in a counterclockwise direction out of the rack into an access position (not shown) where back side port 965A is accessible. This is possible because the radius of edge 942A is at least slightly less than a distance between walls 952 and 954. When base 940A is rotated out of the rack, back side ports 965A and spool 980A are fully accessible from the front side. A representative appearance of patch panel rotating out of the tray is shown by patch panel 930B in FIG. 9. Patch panel 930B may be the same as patch panel 930A, and like reference numerals refer to like elements of patch panel 930A. Patch panel 930B may include a base 940B attached to wall 956 via hinge 972B.

Figure 10:
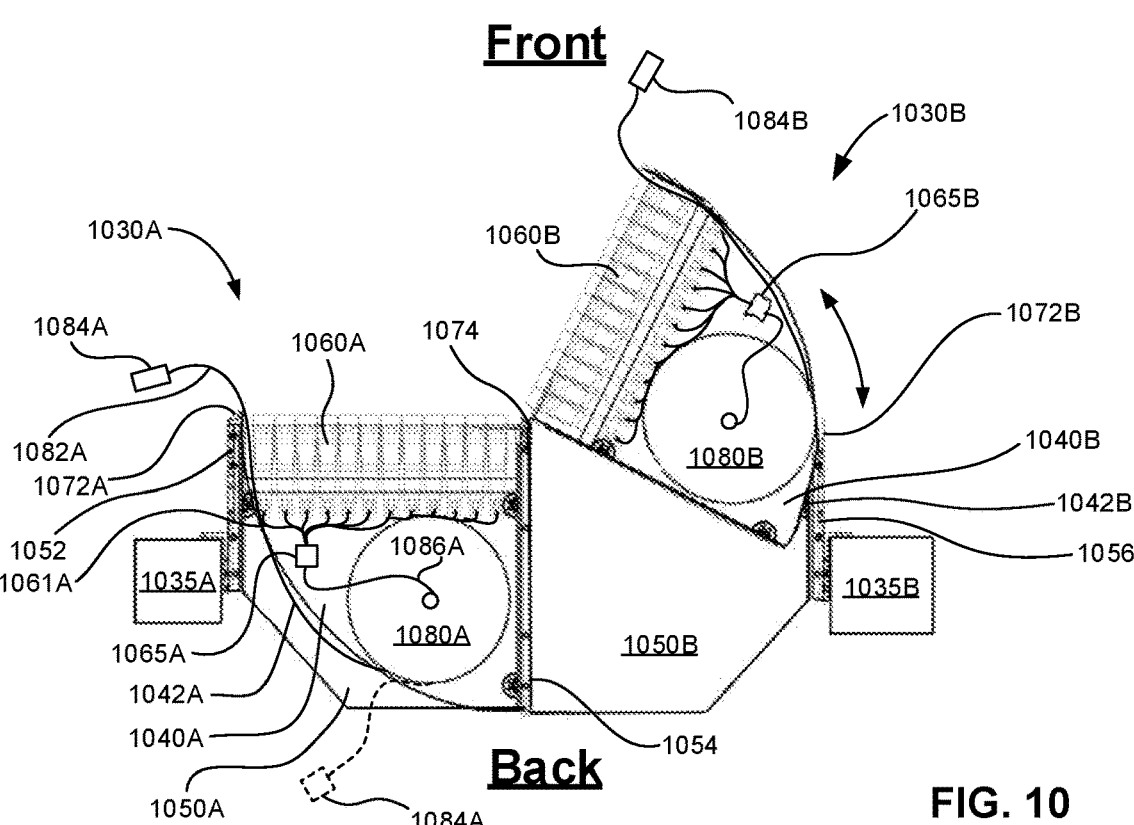
FIG. 10 is a plan view of a patch panel of an embodiment accommodated within a rack, showing how the patch panel may be rotated about walls of the rack.

FIG. 10 illustrates another embodiment of a patch panel arrangement including a first patch panel 1030A and a second patch panel 1030B with similar features to that of the patch panels of FIG. 9. Reference numerals in the 1000-series of numerals in FIG. 10 refer to like reference numerals in the 900-series of numerals in FIG. 9, unless otherwise indicated. As with panels 930A and 930B, panels 1030A and 1030B mirror each other on opposite sides of central wall 1054. For the sake of brevity, the description focuses on first patch panel 1030A, although it should be appreciated that the same features may also be included in second patch panel 1030B. First patch panel 1030A includes tray 1050A extending between wall 1052 and central wall 1054. First patch panel 1030A also includes base 1040A disposed over tray 1050A, the base being rotatably attached to central wall 1054 at a front side of the central wall. As depicted in FIG. 10, such attachment may be via a hinge 1074. Base 1040A includes a curved outer edge 1042A with a radius centered at hinge 1074 such that base 1040A has a surface with a shape of a quarter of a circle. In this manner, base 1040A may be rotated out of its storage position into an access position by rotating base 1040A about hinge 1074 in a clockwise direction out of the rack. Base 1040B may also be rotatably attached to central wall 1054 at hinge 1074 and may be similarly rotated out of its storage position within the rack. However, for base 1040B, rotation out of the rack is via counterclockwise rotation about hinge 1074.

In a variation of patch panels 1030A, 1030B in FIG. 10, central wall 1054 may be removably attached to tray 1050A, 1050B such that the bases 1040A, 1040B may be rotated from a storage position to an access position via rotation about a hinge 1072A at wall 1052 or hinge 1072B at wall 1056. In this manner, bases 1040A, 1040B, with central wall 1054 in between, may be rotatable together about one of the hinges on a side wall 1052, 1056 of the patch panel assembly. The patch panel assembly may be configured to have hinge attachments at one or both of hinge locations 1072A, 1072B in addition to hinge 1074. Hinges 1072A, 1072B may be configured so that respective bases 1040A, 1040B may be attached and detached as desired so that a user may decide whether it is desirable to operate the assembly via rotation about hinge 1074 or about a peripheral hinge 1072A or 1072B.

Still further embodiments of a patch panel are shown in FIGS. 11A-11B and FIGS. 12A-12B. In FIGS. 11A-11B, patch panel 1130 is shown. It should be appreciated that while FIGS. 11A-11B show a tray 1150 in isolation, the patch panel including such tray may be part of a larger rack and may be disposed within a designated receiving location within the rack along with any number of other patch panels supported by walls, posts and other support structures. In this manner, the illustration of patch panel 1130 is not intended to be limiting in any way, and rather, is intended to convey a particular manner of arranging a spool on a tray for ease of access.

With continued reference to patch panel 1130, the panel includes a tray 1150 with spool supports 1152, 1154, 1156, 1158 disposed thereon. The spool supports are positionable on the tray to constrain translational movement of spool 1180, also disposed on tray 1150. In some examples, spool 1180 may include two opposing outer flanges with a central column therebetween. One or both of the flanges may include openings therethrough. When spool supports 1152, 1154, 1156, 1158 constrain spool in such manner, shown in FIG. 11A, spool 1180 is in a stored position. In some variations, one or more of the spool supports is rotatable about a central axis therethrough. Where the supports are rotatable in such manner, rotation of the spool encounters less friction and resistance while being rotated during use to draw cables from the spool or to reinsert cables into the spool, providing improved ease of use. Further, in some variations, one or more of spool supports 1152, 1154, 1156, 1158 is translatable along a surface of tray 1150 or is removably attached to tray 1150. In patch panel 1130, spool supports 1152 and 1154 are translatable along a lateral direction toward or away from sides of tray 1150, as shown in FIG. 11B. Such translation may allow for removal of spool 1180 from tray 1150 when access to the contents of the spool is desired. In this arrangement, storage and operation of spool and removable access to spool is provided even without any spindle operatively connected with spool. In this manner, a spindle is not required to effect operability of patch panel 1130. In some examples, including the embodiment depicted in FIGS. 11A-11B, patch panel 1130 may include four spool supports. In other examples, patch panel 1130 may include three spool supports or five or more spool supports.

In some examples, patch panel 1130 may further include a stabilizer with a gripping feature (not shown) to hold spool 1180 relative to tray 1150. Such stabilizer may be, for example, a bar movably attached to the tray, the bar having a shape to extend into an opening within a flange of spool 1180. Through positioning of the bar within the opening, spool is prevented from rotation. In another example, in one example, the spool may include a flange with a bend or indent sized to receive a stabilizer bar extending from the tray. When the stabilizer bar is received in the bend or indent, e.g., from the side of the spool, the spool is prevented from rotational movement. In yet another example, a clamp that is secured onto the tray with a rotatable extension that clips onto the spool. The aforementioned stabilizers may also be included in the other patch panels described herein, such as panel 1230, 1330, 1330' and 1430, for example.

Movable attachment of each translatable spool support may be accomplished in a variety of ways. In a first variation, a spool support may include an extension received in an elongate slot in the tray, the extension including a pawl or other gripping element for engagement with a complementary engagement element in the slot, such as teeth along a length of the slot. Additional mechanisms may be incorporated into the interaction between the spool support and the tray to control locking of the spool support in a desired location. Control of the locking of the spool support may be via an actuation mechanism accessible from front side 1110 of patch panel 1130. In a second variation, a spool support may include a magnet in operative communication with a complementary magnet in or on the tray. The magnet associated with the tray may be disposed along an extent of desired translation of the spool support along the tray or may itself be movable within the tray. In operation, the magnetic attraction of the combination of magnets may be overcome manually through a user's application of force onto the spool support to move the spool support relative to the tray. In a third variation, the tray may include a pattern of repeating openings that define a grid on the tray surface, each of the openings having a shape for receipt of a projection on an underside of the spool support, the projection being flexible or otherwise having characteristics for removable attachment to an opening in the grid of openings on the tray surface. In operation, the spool support may be removed from a first opening and reattached to another opening to control whether the spool is constrained in the storage position or accessible.

In a fourth variation, a spool support may be mounted on a second end of a swinging arm, a first end of the swinging arm being attached to the tray. A center of the spool support may be secured to a centerline at the second end of the swinging arm. The swinging arm may have a length and an attachment location on the tray so that in a first position of the swinging arm, the spool support abuts the spool and together with other spool supports, constrains the spool. When swung into a second position, the swinging arm and spool support do not obstruct access to the spool, creating space for removal or insertion of the spool relative to a remainder of the patch panel or the rack. In some examples of the fourth variation, the swinging arm may include a biasing member such as a spring, which may be configured to apply a desired holding force against the spool when the swinging arm is in the first position. The swinging arm may also include a locking mechanism to set the swinging arm in the first position, second position or at any other desired position based on rotation of the swinging arm. In one example, the locking mechanism may be an arm extending from the swinging arm to connect to the tray, creating two points of connection with the tray. In another example, the first end of the swinging arm at the tray may include an internal lock which, when activated, prevents rotation of the swinging arm through obstructions to rotation of the swinging arm. In further variations, a single patch panel may include spool supports of two or more of the first through fourth variations described above.

In another embodiment, patch panel 1230 is shown in FIGS. 12A-12B. In FIGS. 12A-12B, reference numerals in the 1200-series of numerals refer to like reference numerals in the 1100-series of numerals in FIGS. 11A-11B, unless otherwise indicated. As with patch panel 1130, patch panel 1230 also includes spool supports disposed on a tray 1250. As depicted, patch panel 1230 includes four spool supports 1252, 1254, 1256, 1258, though may include fewer or more as described for patch panel 1130. As depicted in the Figures, these spool supports take the form of blocks. In patch panel 1230, each spool support includes a concave-shaped inner side surface 1252A, 1254A, 1256A, 1258A with a curvature approximating an outer curved surface of spool 1280. In this manner, respective inner side surfaces of the spool supports are complementary to the outer surface of spool 1280. The spool supports need not be rotatable due to the complementary shape of the inner side surfaces with respect to the spool. A manner of attachment of the spool supports to the tray and adjustability of the spool supports with respect to the tray may include any variation already described for patch panel 1130 above. Similarly, patch panel 1230 may be part of a rack as described for other embodiments of the present disclosure. In alternative embodiments, a patch panel may include a combination of one or more of the spool supports shown in FIGS. 11A-11B and one or more of the spool supports shown in FIGS. 12A-12B.

Figure 13A:
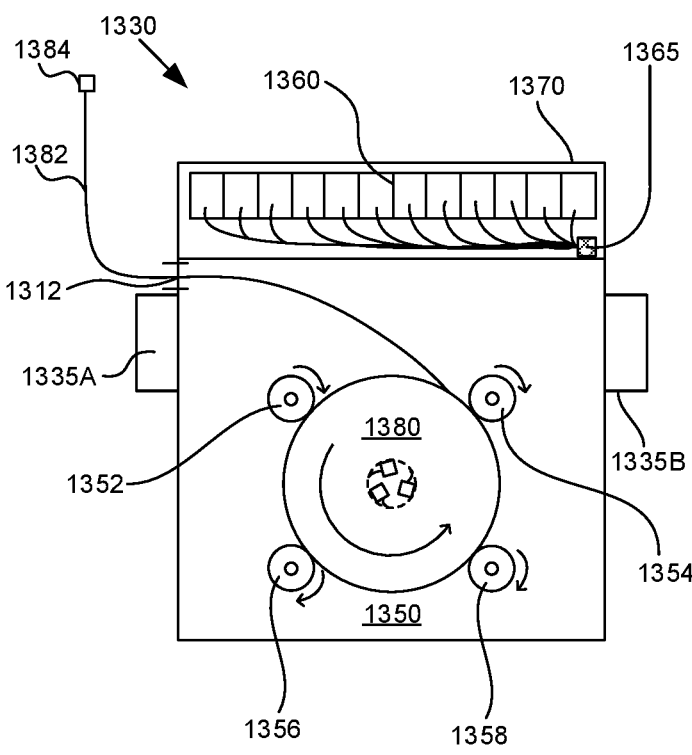
FIGS. 13A-13B are plan views of a patch panel of an embodiment accommodated within a rack, showing how a spool within the patch panel may be stored and accessed.
Figure 13B:
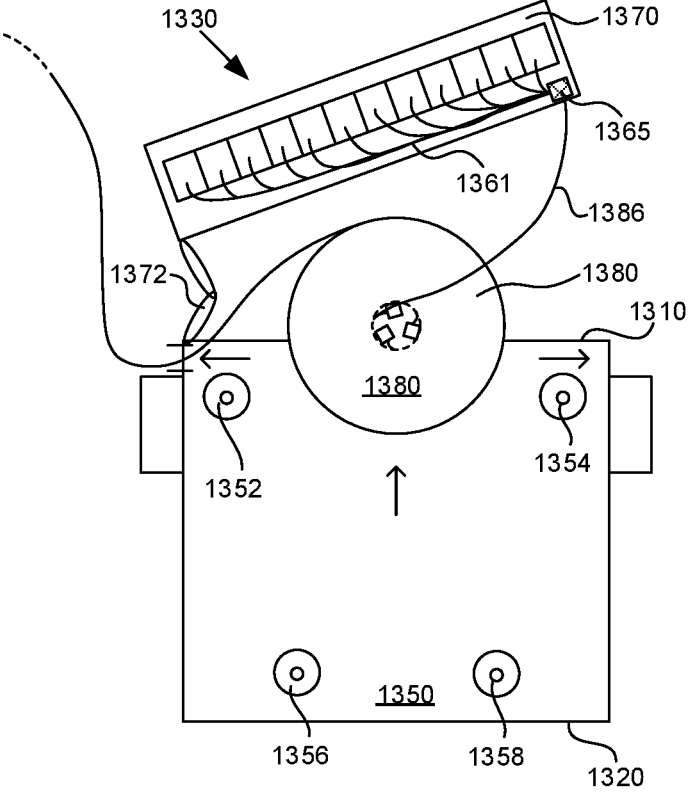

Further embodiments of a patch panel, each including features of patch panel 1130, are shown in FIGS. 13A-13B, 14A-14B and 15A-15B. One of these embodiments is patch panel 1330 shown in FIGS. 13A and 13B. In FIGS. 13A-13B, reference numerals in the 1300-series of numerals refer to like reference numerals in the 1100-series of numerals in FIGS. 11A-11B, unless otherwise indicated. Patch panel 1330 includes tray 1350, also referred to as a main tray, spool 1380 disposable on tray 1350, spool supports 1352, 1354, 1356, 1358 positionable around a periphery of the spool, tray extension 1370, and front side ports 1360, back side port 1365, and inner cable 1361 connecting the respective ports, the ports being disposed on the tray extension. Tray extension 1370 may include an attachment arm 1372 such that when a clip or other fixation mechanism that fixedly holds tray extension 1370 onto tray 1350 is detached, the attachment arm may continue to loosely hold tray extension 1370 to prevent the tray extension from becoming displaced. In other variations (not shown), tray extension 1370 may be removed entirely from tray 1350. In still further variations, a lateral corner of tray 1350 may include a hinge so that tray extension 1370 is rotatable about the hinge to open access to the spool. Spool may include cable extension 1382 disposed therein. One end of the cable extension is staying cable 1386, which may be used to connect to back side port 1365 when cable extension 1382 is pulled out of the rack to a desired extent. An opposite end of cable extension 1382 extends to connector 1384 external to the patch panel. The patch panel may include a side port 1312 on a lateral side of tray 1350 for running of cable extension 1382 out of the patch panel, as shown in FIGS. 13A and 13B. Such side port may also be included in the patch panels of any one of the other embodiments of the present disclosure. For example, in patch panel 1130, 1230, 1330', 1430 and 1530. Spool supports 1352, 1354 may be translatable as described for patch panel 1130 to open and close access to the spool, as shown in FIGS. 13A and 13B. In FIG. 13A, spool 1380 is in the storage position with spool supports 1352, 1354 abutting the spool, while in FIG. 13B, spool 1380 is in the accessible position with spool supports 1352, 1354 spread laterally outward toward posts 1335A, 1335B to create space to remove spool 1380 from within tray 1350.

Turning to methods of utilizing the patch panel, while the patch panel is in the storage position, extension cable 1382 may be retrieved from spool disposed within the patch panel. Resistance to retrieval of the extension cable is reduced due to the nature of attachment of spool supports 1352, 1354, 1356, 1358 to tray 1350 in that each spool support is rotatable about its axis while attached to the tray. As such, in the arrangement shown in FIG. 13A, pulling of extension cable 1382 causes spool 1380 to rotate counterclockwise, while each spool support rotates clockwise, reducing friction between the spool and the spool supports. To convert the patch panel from the storage position to the access position, which may be desirable to access spool 1380 or back side port 1365, tray extension 1370 may first be partially detached, detached, or rotated away from tray 1350. Then, with tray exposed on a front side 1310 of patch panel, spool supports 1352, 1354 may be translated laterally as described above, then spool 1380 may be retrieved from front side 1310. If the patch panel has a stabilizer, such stabilizer may be unlocked prior to removal of spool. As described in other embodiments of the present disclosure, when spool is retrieved in the accessible position, staying cable 1386 may be drawn from the spool and attached to the back side port 1365, as shown in FIG. 13B. It should be appreciated that in the process of retrieving spool 1380, tray 1350 remains stationary and only spool is withdrawn. Once spool supports 1352, 1354 are removed from obstructing spool 1380, the spool is easily removed as such spool does not require support by a spindle.

Figure 14A:
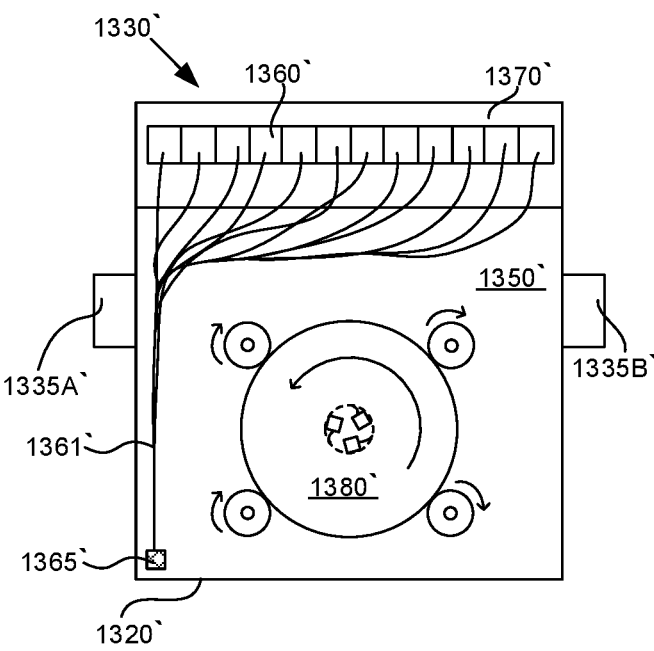
FIGS. 14A-14B are plan views of a variation of the patch panel shown in FIGS. 13A-13B, showing how a spool within the patch panel may be stored and accessed.
Figure 14B:
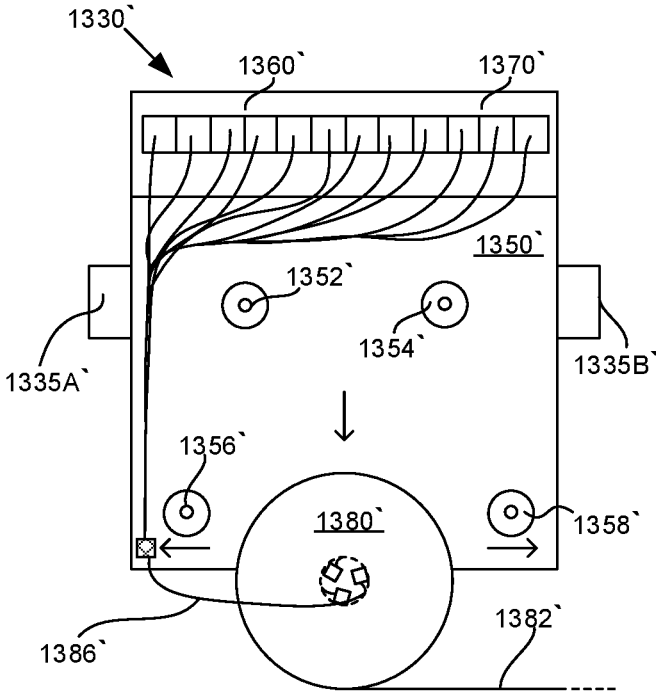

In a variation of patch panel 1330 shown in FIGS. 13A and 13B, such patch panel may be configured for access from a back side 1320 of the patch panel. Such variation is shown as patch panel 1330' in FIGS. 14A and 14B. In FIGS. 14A-14B, reference numerals in the 1300' (1300 prime)-series of numerals refer to like reference numerals in the 1300-series of numerals in FIGS. 13A-13B, unless otherwise indicated. Patch panel 1330' may be the same patch panel as patch panel 1330, but with back side port 1365' moved and/or positioned proximate back side 1320' of the patch panel, as shown in FIGS. 14A and 14B. In this manner, spool supports 1356' and 1358' may be repositioned laterally towards sides of tray 1350' to access and remove spool 1380', as shown in FIG. 14B. When spool 1380' is retrieved from back side 1320', staying cable 1386' may be retrieved from the spool and connected to back side portion 1365'. Further, extension cable 1382' may also be retrieved for use as a cable connection to secure to additional cable external to the patch panel.

Figure 15A:
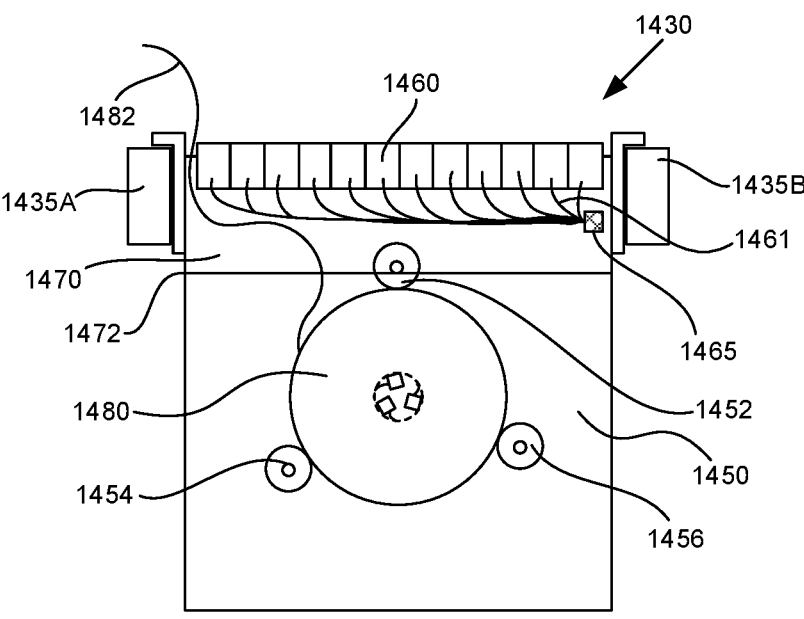
FIGS. 15A-15B are plan views of a patch panel of an embodiment accommodated within a rack, showing how a spool within the patch panel may be stored and accessed.
Figure 15B:
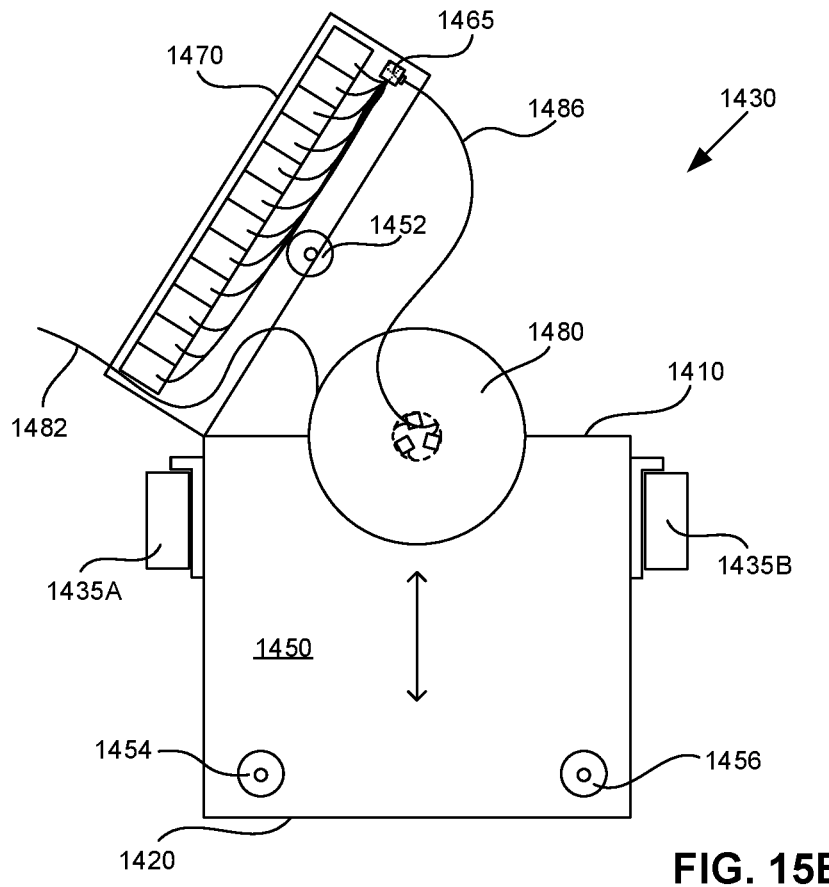

In another embodiment, patch panel 1430 is shown in FIGS. 15A and 15B. In FIGS. 15A-15B, reference numerals in the 1400-series of numerals refer to like reference numerals in the 1300-series of numerals in FIGS. 13A-13B, unless otherwise indicated. Patch panel 1430 may be used in a manner similar to patch panel 1330, although may have a different arrangement of spool supports on tray 1450 and tray extension 1470. In particular, one spool support 1452 may be attached on tray extension 1470 while spool supports 1454 and 1456 may be attached to tray 1450. As with other similar embodiments described herein, each spool support may be rotatable about its axis. In this configuration, when patch panel 1430 is in a storage position as shown in FIG. 15A, the three spool supports constrain spool 1480 against translation to keep spool on tray 1450. To retrieve the spool from the storage position, tray extension 1470 may be partially detached, detached, or rotated relative to tray 1450 to expose tray 1450, as shown in FIG. 15B. Because spool support 1452 is attached to tray extension 1470, such movement of tray extension leaves spool 1480 exposed and unobstructed by any spool supports on front side 1410 of patch panel 1430. In this manner, spool 1480 may simply be pulled out of front side 1410. In this position, back side port 1465 is also accessible, and staying cable 1486 may be attached to back side port 1465 as desired. In some variations of this embodiment, spool supports 1454, 1456 may be removably engageable with tray 1450 such that, if access from back side 1420 is desired, such spool supports 1454, 1456 may be translated laterally toward side walls of the tray or otherwise may be temporarily removed to access spool 1480.

In still further embodiments, each of the embodiments shown in FIGS. 13A-13B, 14A-14B, and 15A-15B may also include spool supports such as those shown in FIGS. 12A-12B, e.g., spool supports 1252, 1254, 1256, 1258. As with spool supports 1352, 1354, 1356, 1358, resistance to retrieval of the extension cable is reduced due to the low-friction inward facing surfaces of spool supports 1252, 1254, 1256, 1258. In this manner, as the spool rotates in response to retrieval of extension cable from spool, the low friction surfaces do not introduce difficulty in completing such retrieval. Rather, the inward facing surfaces of such spool supports facilitate sliding of the outer surface of the spool on the surfaces.

Figure 16A:
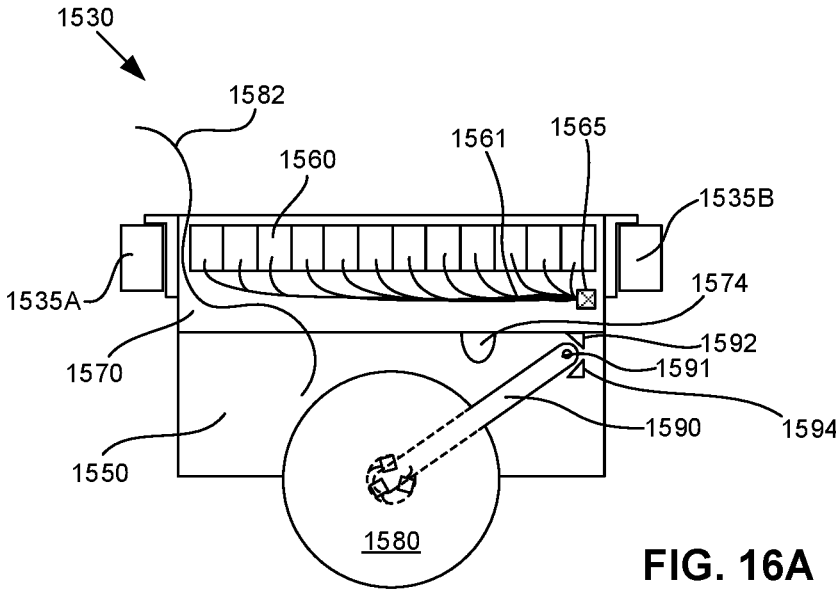
FIGS. 16A-16B are plan views of a patch panel of an embodiment accommodated within a rack, showing how a spool within the patch panel may be stored and accessed.
Figure 16B:
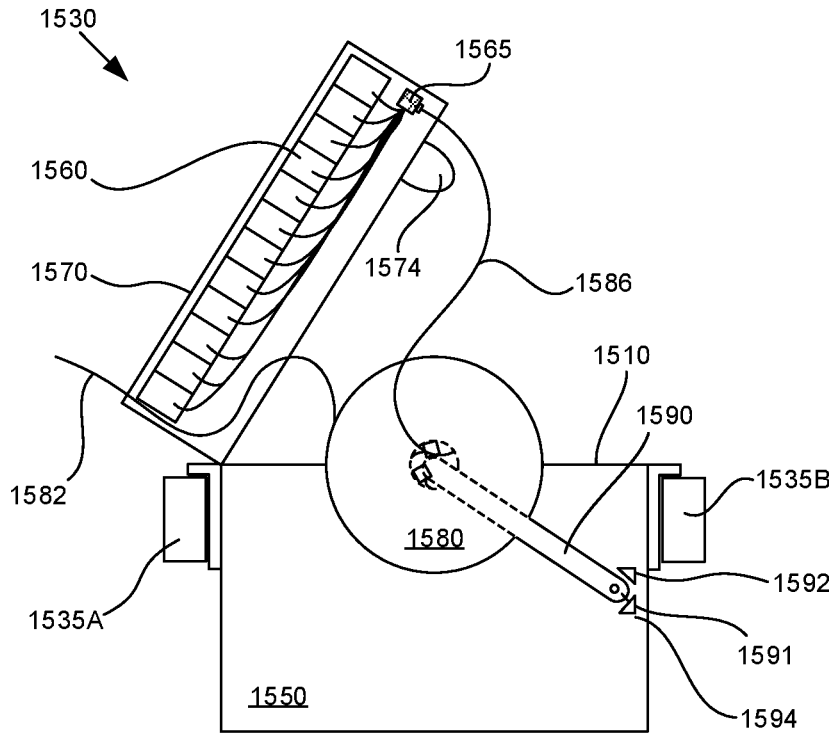

In yet another embodiment, a patch panel may be as shown in FIGS. 16A and 16B and indicated by reference numeral 1530. In FIGS. 16A-16B, reference numerals in the 1500-series of numerals refer to like reference numerals in the 1300-series of numerals in FIGS. 13A-13B, unless otherwise indicated. Patch panel 1530 includes a tray 1550, also referred to as a main tray, and a tray extension 1570. As depicted, the patch panel may be secured in place on a rack via posts 1535A, 1535B, and may be one of many patch panels in the rack. In the variation shown in FIGS. 16A and 16B, tray extension 1570 is attached to one or both posts 1535A, 1535B so that tray extension is directly above tray 1550. In such an arrangement, tray extension 1570 and tray 1550 are separately attached to the posts. In other variations, the tray extension may be in an attached position through securement to a front side of the main tray, i.e., with the trays beside each other and one elevation, similar to the arrangement shown in FIGS. 13A-13B, for example.

Tray extension 1570 may include front side ports 1560 and back side port 1565 disposed thereon, as shown in FIGS. 16A and 16B. In other variations, the back side port may be positioned on tray 1550. Tray 1550 may include swinging arm 1590 attached thereto via arm pin 1591. On an end of swinging arm 1590 opposite the arm pin, spool 1580 is secured to the swinging arm. At the attachment of swinging arm 1590 and spool 1580, swinging arm 1590 is free floating so that the spool may be moved relative to the tray. In this manner, spool 1580 is movable into and out of a position over tray 1550 via swinging of the swinging arm 1590 about arm pin 1591, as shown via a comparison of FIGS. 16A and 16B. In some examples, and as shown in FIGS. 16A and 16B, front and back guide blocks 1592, 1594 may be attached to tray 1550. Such guide blocks may be positioned on the tray to provide a physical limit on a range of rotation of swinging arm 1590 about pin 1591. Thus, in one particular example, swinging arm may rotate from about 45 degrees backward from a lateral plane through the patch panel to about 45 degrees frontward from the lateral plane, a similar range being shown in FIGS. 16A and 16B, the lateral plane being orthogonal to a front-back axis through the patch panel. However, it should be appreciated that the guide blocks may be positioned and oriented to achieve any desired range of rotation, such as a range greater than that described above. Additionally, the tray may also include a side block 1574 attached onto a back side of tray extension 1570. Such side block 1574 may be positioned to restrict frontward movement of spool 1580 when the tray extension is closed on the tray and the spool is in a storage position as shown in FIG. 16A. This function is fulfilled by side block 1574 pressing against swinging arm 1590 so that the swinging arm cannot rotate toward a front side 1510 of the tray or a front side of the patch panel more generally. When tray extension 1570 is positionable over tray 1550, side block 1574 may include a vertical segment so that a free end of the side block is positionable at a level with swinging arm 1590 so it may block the swinging arm when in a closed position.

In operation, commencing from a closed position as shown in FIG. 16A, access to the contents of the patch panel may proceed as follows. Tray extension 1570 is partially detached or fully detached from tray 1550. In the depicted embodiment, tray extension 1570 is removed from its attachment to one or both posts 1535A, 1535B. In some examples, lateral sides of tray extension 1570 include engagement features that complement engagement features on the post so that the tray extension may be attached and detached. Such features may be a respective protrusion and recess. In other examples, one or both posts may include a hinge plate so that tray extension 1570 may be rotated into and out of its position in the patch panel. In a variation where the tray extension is positioned in front of tray in a manner similar to that shown in FIGS. 13A-13B, the patch panel may include a hinge plate at a front side on either or both corners of the tray for the tray extension to rotate about to partially detach the tray extension from the tray. In other examples of such variation, the tray extension may be completely removed from the tray. And, in any of the above variations, prior to the detaching step, any clips or other locks (not shown) maintaining full fixation between the tray extension and the tray, as applicable, are removed or unlocked.

Once tray extension 1570 is opened as shown in FIG. 16B, side block 1574 is no longer abutting the swinging arm, and spool 1580 may be withdrawn from the tray 1550. A range of motion of spool 1580 is predetermined based on a length of swinging arm 1590 and any limit on rotation presented by front guide block 1592 and back guide block 1594. Once the spool is rotated out of the cavity over the tray, a desired amount of extension cable 1582 may be pulled from the spool and an opposite end of the cable may be used as a staying cable 1586 to connect to back side port 1565, as shown in FIG. 16B. To close the patch panel from the position shown in FIG. 16B, the spool may simply be rotated back into a position over tray 1550 and then tray extension 1570 may be resecured to the rack either above the tray or onto a side of the tray. As noted above, any clips, locks or other locking mechanisms to fully fix the tray extension to the tray may be reattached at this juncture, if applicable.

In variations of patch panel 1530, the swinging arm may be deformable to provide an increased range of motion for the arm during use.

Figure 17A:
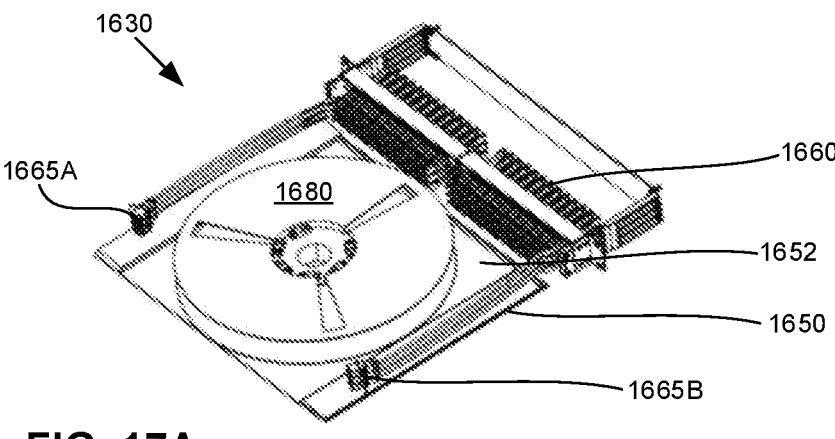
FIGS. 17A-17C are perspective views of a patch panel according to an embodiment.
Figure 17B:
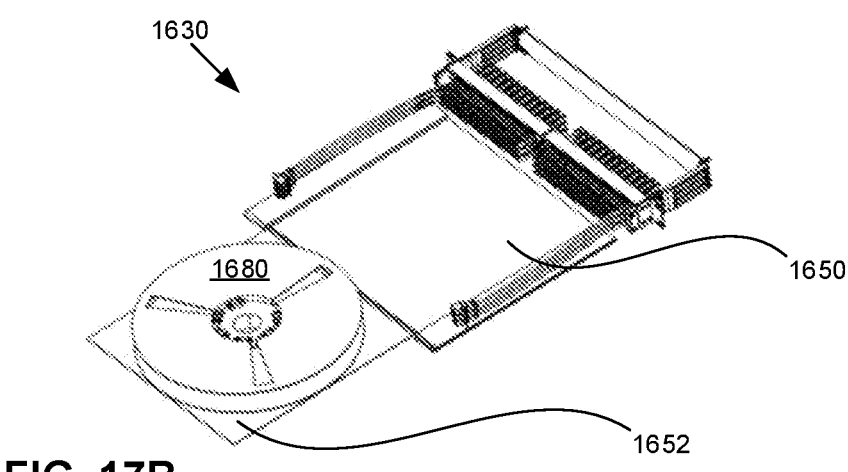
Figure 17C:
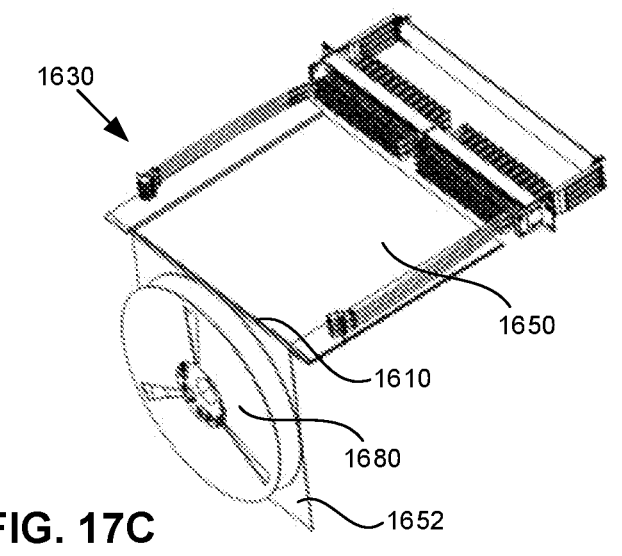

In a variation of many embodiments contemplated by the present disclosure, such as those shown in FIGS. 1-6B and 11A-16B, the patch panel may optionally include a tray along with a drop-down panel, such as that shown in patch panel 1630 in FIGS. 17A-17C. In embodiments modified to have a tray 1650 and drop-down panel 1652, a spool 1680 may be disposed on the drop-down panel 1652. The spool may be rotatably attached to the drop-down panel through known adhesives or securement techniques. In a storage configuration, such as that shown in FIG. 17A, drop-down panel 1652 is positioned directly over tray 1650. When retrieval of the spool contents is desired drop-down panel 1652 is pulled or slid out from tray 1650, as shown in FIG. 17B. Tray 1650 and drop-down panel 1652 may be interconnected such that when most or all of the drop-down panel is advanced out from the tray, the drop-down panel remains held in place along a front side 1610 of tray 1650. The weight of spool 1680 may cause the spool and drop-down panel to rest in a vertical orientation relative to the body of the patch panel as shown in FIG. 17C when the patch panel is disposed in a rack that stands on a floor surface. To facilitate and guide relative movement between tray 1650 and drop-down panel 1652, the tray may include one or more rails or channels (not shown) in operative communication with complementary channels or rails on an underside of drop-down panel 1452. Proximate front side 1610, tray 1650 may include protrusions or other features to limit the extent of relative sliding between the drop-down panel and the tray. In this manner, drop-down panel 1652 may remain attached to tray 1650 when fully withdrawn from a body of the patch panel.

Figure 17D:
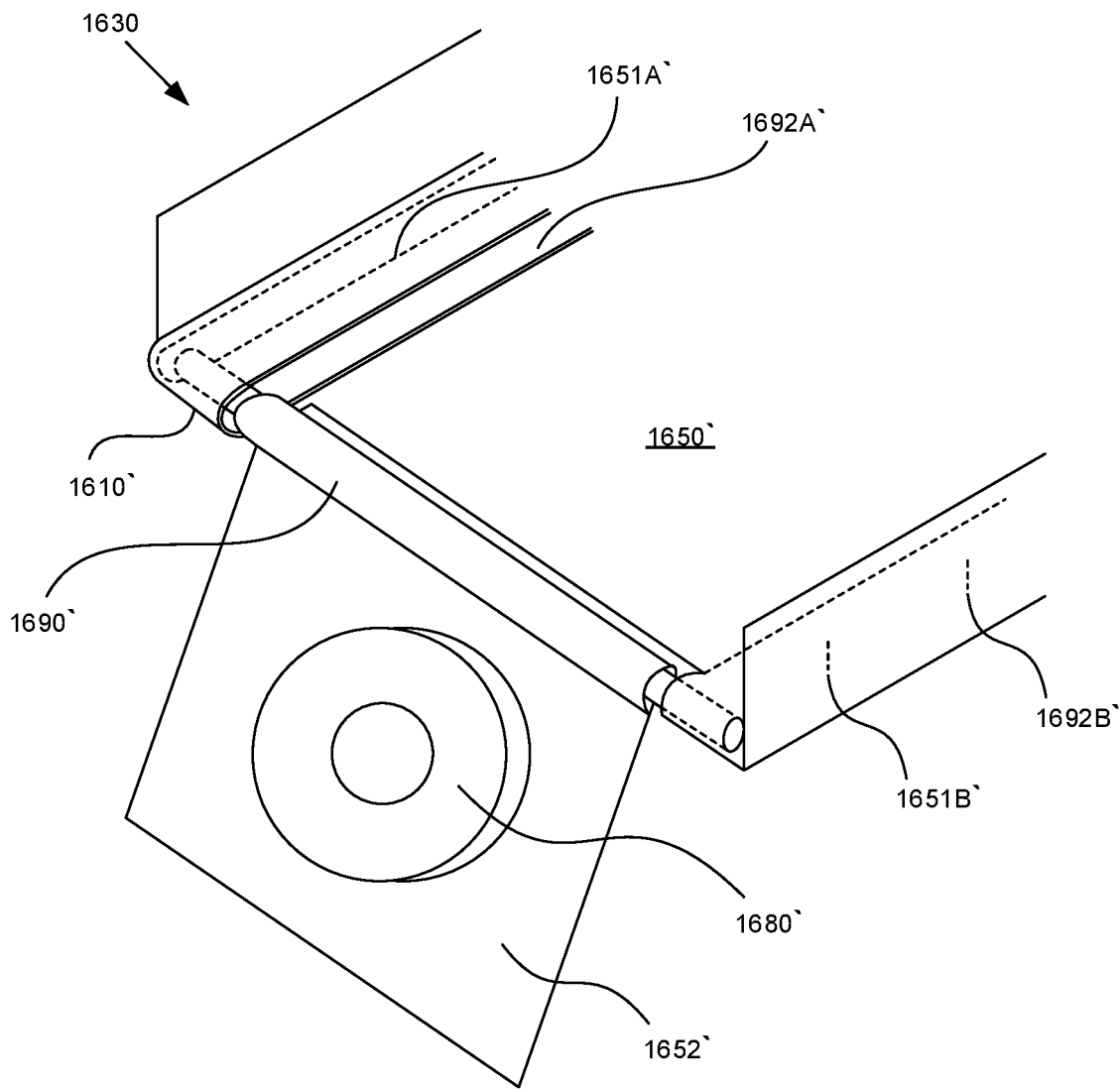
FIG. 17D is a close-up perspective view of a variation of the patch panel shown in FIGS. 17A-17C.

A variation of the patch panel shown in FIGS. 17A-17C is indicated by reference numeral 1630' and shown in FIG. 17D. Patch panel 1630' includes a tray 1650' having elongate lateral side portions 1651A' and 1651B' on opposite sides of a central region. The lateral side portions include respective elongate channels 1692A', 1692B'. These elongate channels include inward side-facing openings and are sized to house a lateral rod 1690' slidably disposed therein. The channels may have a length shorter than the respective side portions so that the channels have internal ends within the side portions. In FIG. 17D, lateral rod 1690' is advanced to its forwardmost extent at front side 1610' of tray 1650'. Tray extension 1652' may be attached to lateral rod 1690' and may include spool 1680' rotatably attached thereto. The attachment of tray extension 1652' to lateral rod 1690' may be pivotable in nature such that when tray extension 1652' is withdrawn from the tray, the tray extension may rotate downward as shown in FIG. 17D. In operation, lateral rod 190' may be slid in a forward-backward direction to control whether spool 1680' is disposed on tray 1650' as shown in FIG. 17A or whether spool 1680' is withdrawn from tray 1650' and accessible to a user, as shown in FIG. 17D. Releasable locking features may be optionally incorporated into the elongate channels and/or the lateral rod to temporarily hold the lateral rod relative to the tray in a storage position, such as that shown in FIG. 17A.

Embodiments of the present technology include, but are not restricted to, the following.

(1) A patch panel, including an enclosure having a front portion for accommodating a plurality of front side ports, and a back portion for accommodating one or more back side ports and for storing one or more extension cables; and one or more inner cables for connecting at least one of the front side ports to at least one of the back side ports, wherein the enclosure is configured such that when the patch panel is placed in a rack, the front side ports are proximate a first side of the rack, and the back side ports are proximate a second side of the rack, the first side of the rack and the second side of the rack being opposite, or substantially opposite, one another, and wherein the one or more extension cables include one or more connectors configured to connect with one or more of the back side ports.

(2) The patch panel according to (1), wherein the one or more extension cables are stored in a spool, and the back portion is configured to accommodate the spool with the one or more extension cables stored in the spool.

(3) The patch panel according to (1), wherein the one or more back side ports are proximate a back end of the back portion of the enclosure such that the one or more back side ports are accessible by hand.

(4) The patch panel according to (1), further including a plurality of sliding trays for accommodating the plurality of front side ports.

(5) The patch panel according to (1), wherein the plurality of front side ports include one or more adaptors.

(6) The patch panel according to (5), wherein the plurality of front side ports include one or more fiber optic adaptors.

(7) The patch panel according to (1), wherein the one or more back side ports include one or more adaptors.

(8) The patch panel according to (7), wherein the one or more back side ports includes one or more fiber optic adaptors.

(9) The patch panel according to (1), wherein each of the one or more extension cables includes a staying end and an extending end, and the one or more connectors configured to connect with one or more of the back side ports are included in one or more the staying ends.

(10) The patch panel according to (9), wherein the one or more extending ends include one or more connectors.

(11) The patch panel according to (1), wherein one or more of the inner cables is a breakout cable.

(12) A patch panel, including a rack attachment mechanism for movably securing the patch panel to a rack; a front portion for accommodating a plurality of front side ports; a back portion for accommodating one or more back side ports and for storing one or more extension cables; and one or more inner cables for connecting at least one of the front side ports to at least one of the back side ports, wherein the patch panel is configured such that when the patch panel is placed in the rack, the front portion is proximate a first side of the rack, and the back portion is proximate a second side of the rack, the first side of the rack and the second side of the rack being opposite, or substantially opposite, one another.

(13) The patch panel according to (12), wherein the rack attachment mechanism includes at least two brackets for attaching to respective posts of the rack and at least two sliding portions for slidably engaging with respective ones of the at least two brackets.

(14) The patch panel according to (12), wherein the rack attachment mechanism includes one or more pivot mechanisms, each pivot mechanism movably securing the patch panel to a respective post of the rack so that the patch panel is rotatable about the post.

(15) The patch panel according to (14), wherein each of the one or more pivot mechanisms is a hinge that is releasably attachable to the respective post and allows the patch panel to rotate about the post when the hinge is attached to the post.

(16) The patch panel according to (14), wherein when the patch panel is rotated out of the rack, the one or more back side ports are accessible from the first side of the rack.

(17) The patch panel according to (14), further including a tapered base.

(18) The patch panel according to (12), wherein the one or more back side ports are movable at least in a direction toward a back end of the back portion and a direction away from the back end of the back portion.

(19) The patch panel according to (12), wherein the one or more extension cables include one or more connectors configured to connect with one or more of the back side ports.

(20) The patch panel according to (12), wherein the one or more extension cables are stored in a spool, and the back portion is configured to accommodate the spool with the one or more extension cables stored in the spool.

(21) The patch panel according to (12), wherein the one or more back side ports are proximate a back end of the back portion of the enclosure such that the one or more back side ports are accessible by hand.

(22) A patch panel including a rack attachment mechanism for fixation of the patch panel to a rack; and a tray accommodating a spool and a plurality of spool supports, the plurality of spool supports being positionable on the tray such that each spool support of the plurality of spool supports is external to the spool and adjacent to a peripheral side of the spool, wherein at least one spool support of the plurality of spool supports is movable relative to the tray to adjust the plurality of spool supports from a first arrangement constraining the spool to a first position on the tray to a second arrangement where the spool is removable from the tray.

(23) The patch panel according to (22), wherein each of the plurality of spool supports is a roller rotatable about its longitudinal axis when attached to the tray.

(24) The patch panel according to (22), wherein each of the plurality of spool supports is a block with a low-friction inner side surface shaped to complement the peripheral side of the spool.

(25) The patch panel according to (22), wherein the tray is configured to remain stationary within the rack when the spool is removed from the patch panel.

(26) The patch panel according to (22), wherein the tray further includes a tray extension for accommodating a plurality of front side ports; and a main tray accommodating the spool and the plurality of spool supports, the tray extension being movable relative to the main tray to control access to the spool from a front side of the patch panel, a first side of the tray extension defining the front side of the patch panel.

(27) The patch panel according to (26), further comprising a back side port attached to the tray extension such that when the tray extension is at least partially separated from the main tray, the back side port is accessible from the front side.

(28) The patch panel according to (26), further comprising a back side port attached to the main tray such that the back side port is accessible from a back side of the patch panel, the back side being opposite from the front side.

(29) The patch panel according to (26), wherein the at least one spool support of the plurality of spool supports is positioned proximate the front side such that movement of the at least one spool support creates space for removal of the spool from the front side of the tray.

(30) The patch panel according to (26), wherein the at least one spool support of the plurality of spool supports is positioned proximate a back side of the patch panel, the back side being opposite the front side, such that movement of the at least one spool support creates space for removal of the spool from the back side of the tray.

(31) The patch panel according to (26), wherein the at least one spool support of the plurality of spool supports is fixedly attached to the tray extension.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A patch panel, comprising:
   an enclosure having a front portion for accommodating a plurality of front side ports, and a back portion for accommodating one or more back side ports and for storing one or more extension cables; and one or more inner cables for connecting at least one of the front side ports to at least one of the back side ports, wherein the enclosure is configured such that when the patch panel is placed in a rack, the front side ports are proximate a first side of the rack, and the back side ports are proximate a second side of the rack, the first side of the rack and the second side of the rack being opposite, or substantially opposite, one another, wherein the one or more extension cables include one or more connectors configured to connect with one or more of the back side ports, wherein the one or more extension cables are stored in a spool that is rotatable independent of the one or more back side ports, and the back portion is configured to accommodate the spool with the one or more extension cables stored in the spool, and wherein the spool is slidably removable from the back portion of the enclosure, wherein the spool is fully rotatable such that the one or more extension cables may be completely unspooled from the spool by pulling on an end of the one or more extension cables, and wherein the one or more back side ports are positioned at a back end of the back portion of the enclosure such that the one or more back side ports are accessible by hand.

2. The patch panel according to claim 1, further comprising a plurality of sliding trays for accommodating the plurality of front side ports, each front side port of the plurality of front side ports having one or more adaptors.

3. The patch panel according to claim 2, wherein the plurality of front side ports comprise one or more fiber optic adaptors.

4. The patch panel according to claim 1, wherein the one or more back side ports comprises one or more fiber optic adaptors.

5. The patch panel according to claim 1, wherein each of the one or more extension cables comprises a staying end and an extending end, and the one or more connectors configured to connect with one or more of the back side ports are included in one or more the staying ends.

6. The patch panel according to claim 1, wherein one or more of the inner cables is a breakout cable.

7. A patch panel, comprising:

a rack attachment mechanism for movably securing the patch panel to a rack;

a front portion for accommodating a plurality of front side ports;

a back portion for accommodating one or more back side ports and for storing one or more extension cables; and one or more inner cables for connecting at least one of the front side ports to at least one of the back side ports, wherein the patch panel is configured such that when the patch panel is placed in the rack, the front portion is proximate a first side of the rack, and the back portion is proximate a second side of the rack, the first side of the rack and the second side of the rack being opposite, or substantially opposite, one another, wherein the one or more extension cables are stored in a spool that is rotatable independent of the one or more back side ports, and the back portion is configured to accommodate the spool with the one or more extension cables stored in the spool, and wherein the spool is fully rotatable such that the one or more extension cables may be completely unspooled from the spool by pulling on an end of the one or more extension cables, and wherein the one or more back side ports are positioned at a back end of the back portion such that the one or more back side ports are accessible by hand.

8. The patch panel according to claim 7, wherein the rack attachment mechanism comprises at least two brackets for attaching to respective posts of the rack and at least two sliding portions for slidably engaging with respective ones of the at least two brackets.

9. The patch panel according to claim 7, wherein the rack attachment mechanism comprises one or more pivot mechanisms, each pivot mechanism movably securing the patch panel to a respective post of the rack so that the patch panel is rotatable about the post.

10. The patch panel according to claim 9, wherein when the patch panel is rotated out of the rack, the one or more back side ports are accessible from the first side of the rack.

11. The patch panel according to claim 7, wherein the one or more back side ports are movable at least in a direction away from the back end of the back portion.

12. The patch panel according to claim 7, wherein the one or more extension cables comprise one or more connectors configured to connect with one or more of the back side ports.

13. A patch panel, comprising:

a rack attachment mechanism for fixation of the patch panel to a rack; and a tray accommodating a spool and a plurality of spool supports, the plurality of spool supports being positionable on the tray such that each spool support of the plurality of spool supports is external to the spool and adjacent to a peripheral side of the spool such that the spool supports constrain translational movement of the spool through contact with the spool and are arrangeable to allow the spool to be removed from the tray by sliding the spool away from the spool supports, wherein at least one spool support of the plurality of spool supports is movable relative to the tray to adjust the plurality of spool supports from a first arrangement constraining the spool to a first position on the tray to a second arrangement where the spool is removable from the tray.

14. The patch panel according to claim 13, wherein each of the plurality of spool supports is a roller rotatable about its longitudinal axis when attached to the tray.

15. The patch panel according to claim 13, wherein each of the plurality of spool supports is a block with a low-friction inner side surface shaped to complement the peripheral side of the spool.

16. The patch panel according to claim 13, wherein the tray is configured to remain stationary within the rack when the spool is removed from the patch panel.

17. The patch panel according to claim 13, wherein the tray further comprises:

a tray extension for accommodating a plurality of front side ports; and a main tray accommodating the spool and the plurality of spool supports, the tray extension being movable relative to the main tray to control access to the spool from a front side of the patch panel, a first side of the tray extension defining the front side of the patch panel.

18. The patch panel according to claim 17, further comprising a back side port attached to the tray extension such that when the tray extension is at least partially separated from the main tray, the back side port is accessible from the front side.

19. The patch panel according to claim 17, further comprising a back side port attached to the main tray such that the back side port is accessible from a back side of the patch panel, the back side being opposite from the front side.

20. The patch panel according to claim 17, wherein the at least one spool support of the plurality of spool supports is positioned proximate the front side such that movement of the at least one spool support creates space for removal of the spool from the front side of the tray.

21. The patch panel according to claim 17, wherein the at least one spool support of the plurality of spool supports is positioned proximate a back side of the patch panel, the back side being opposite the front side, such that movement of the at least one spool support creates space for removal of the spool from the back side of the tray.

22. The patch panel according to claim 17, wherein the at least one spool support of the plurality of spool supports is fixedly attached to the tray extension.

\* \* \* \* \*